United States Patent
Zhao et al.

(10) Patent No.: US 7,058,403 B2
(45) Date of Patent: Jun. 6, 2006

(54) MOBILITY MANAGEMENT STATE TRANSITION SYSTEM AND METHOD FOR HANDLING DARK BEAM SCENARIOS

(75) Inventors: Wei Zhao, Germantown, MD (US); Anthony Noerpel, Lovettsville, VA (US); Abheek Saha, New Delhi (IN); Sandeep Verma, New Delhi (IN); Tom Peters, Dayton, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 664 days.

(21) Appl. No.: 10/185,277

(22) Filed: Jun. 28, 2002

(65) Prior Publication Data

US 2003/0045289 A1    Mar. 6, 2003

Related U.S. Application Data

(60) Provisional application No. 60/317,560, filed on Sep. 6, 2001.

(51) Int. Cl.
*H04Q 7/20*    (2006.01)

(52) U.S. Cl. .................. 455/435.1; 455/427; 455/12.1; 455/428; 455/430; 455/429; 455/13.2; 455/437; 370/316; 709/203; 709/105

(58) Field of Classification Search ............... 455/12.1, 455/13.3, 427, 428, 429, 436, 435.1, 435.2, 455/440, 456.1, 439, 437, 13.1, 13.2; 370/316; 709/203, 105
See application file for complete search history.

(56) References Cited

U.S. PATENT DOCUMENTS

| | | | |
|---|---|---|---|
| 5,574,968 A * | 11/1996 | Olds et al. .................. 455/428 |
| 6,181,932 B1 * | 1/2001 | Kolev et al. ................. 455/428 |
| 6,418,314 B1 * | 7/2002 | Lindvall et al. .......... 455/435.1 |
| 6,868,270 B1 * | 3/2005 | Dent ........................ 455/435.1 |
| 2003/0045241 A1 * | 3/2003 | Noerpel et al. ............ 455/67.1 |

* cited by examiner

*Primary Examiner*—Charles N. Appiah
*Assistant Examiner*—Randy Peaches
(74) *Attorney, Agent, or Firm*—Craig Plastrik

(57) ABSTRACT

A state transition diagram is presented for a user's access terminal for a satellite telecommunication system, showing the state of the access terminal's mobility management software layer, in response to various stimuli and conditions as the user enters into and out of various modes of operations, including deactivation, activation and illumination of a dark beam of a spot beam that is a shared resource.

26 Claims, 10 Drawing Sheets

MOBILITY MANAGEMENT STATE TRANSITION SYSTEM AND METHOD FOR HANDLING DARK BEAM SCENARIOS

This application claims benefit under 35 U.S.C. §119(e) from provisional patent application Ser. No. 60/317,560, filed on Sept. 6, 2001, the entire contents of which are incorporated herein by reference.

FIELD OF THE INVENTION

The present invention relates to cellular and satellite communications. More particularly, the invention relates to a method and system of sharing radio resources between at least one existing service provider and a second existing or new service provider, to provide both new and existing services to their respective users.

BACKGROUND OF THE INVENTION

Great advances in the field of wireless communications have been made over the past ten to twenty years, and continue to be made. These advances both improve the quality of communication, e.g., the clarity and reliability of communication, and improve the geographic coverage of such wireless communications. As industry strives to provide a wireless communications capability that covers the entire globe, factors such as economic viability dictate that space-based transceivers be employed to compliment ground infrastructure. Ground infrastructure remains technologically advantageous and economically preferable in identified population centers where a great deal of bandwidth is required in a relatively small area. However, satellites can provide universal coverage economically extending coverage over less populated areas. Thus, two types of wireless communication, i.e., ground infrastructure cellular, and space-based satellite systems have emerged. One of the most ubiquitous terrestrial cellular systems is the Global System for Mobile Communications (GSM). Geo Mobile Radio (GMR-1) is an example of systems which are extensions of GSM to the mobile satellite communication system venue.

In both types wireless communication systems, there are physical channels and logical channels. A physical channel in GSM or GMR-1 is a continuous allocation of resources including both a frequency and a time component. The frequency is given by an absolute radio frequency channel number (ARFCN) allocation, and the time component is given by the allocated time slot(s) within a frame. Logical channels are mapped to physical channels. Logical air interface channels of interest include: broadcast control channel (BCCH) 5 (from network to a user access terminal or forward direction); random access channel (RACH) 19 (from user access terminal to network or return direction); and access grant channel (AGCH) 21 (forward direction). The network uses logical channels to convey signaling and control message. For example, system information messages are conveyed on the BCCH 5, channel request messages are conveyed on the RACH 19 and immediate assignment reject and immediate assignment messages are conveyed on the AGCH 21. Messages contain information elements and information elements can have many different values.

FIG. 1 illustrates a block diagram of a satellite communication system according to the prior art. A satellite communications network, such as a geo-synchronous earth orbit mobile communications network, comprises at least one geo-synchronous earth orbit satellite 6, a ground-based resource manager (RM) 16 and spacecraft operations center (SOC), associated with satellite 6, at least one ground-based existing gateway station (EGW) 8, and at least one user access terminal 20, which is typically a hand-held or vehicle mounted mobile telephone. Satellite 6 enables access terminal 20 to communicate with other access terminals 20 or with other telephones in a terrestrial network (for example, a public switched telephone network or PSTN), via the gateway stations. RM 16 provides system-wide resource management, and the SOC controls on-orbit satellite operations for its respective satellite 6. A system may comprise one or more satellites 6.

In a terrestrial cellular system an antenna's coverage area (both receive and transmit) is known as a cell. The equivalent concept in a mobile satellite system is a spot beam. The spot beam is defined as the coverage area of a satellite antenna or antenna subsystem, which may consist of a phased an-ay or a multiplicity of antenna elements with or without a reflector. The typical mobile satellite may have hundreds of spot beams. A "cell" or "spot beam" is defined to exist independent of whether or not it is actually radiating or receiving energy at the time. Thus, we can define an illuminated spot beam as a beam into which energy is actually being radiated by the antenna and a dark spot beam as a beam in which the satellite's antenna is not radiating any energy or a signal. More specifically, the transmission of BCCH 5 into the cell or spot beam is required.

The spot beam in FIG. 1 shall be referred to as spot beam 10. BCCH 5 contains the system information necessary for access terminal 20 to receive so that it can be aware of the cell or spot beam's 10 existence. In GSM cellular technology specifications an access terminal is referred to as a "mobile station" (MS). In the GMR-1 mobile satellite specifications an access terminal is referred to as a "mobile earth station" (MES). For generality, the term "access terminal" 20 will be used in this document The system information messages broadcast by the network on the BCCH 5 contain the information necessary for access terminal 20 (as shown in FIG. 1) to determine where the RACH 19 and AGCH 21 channels are (timeslots and ARFCNs) and any rules governing the use of the RACH 19 channel by access terminal 20. In GSM and GMR-1, RACH 19 channels and AGCH 21 channels are paired so that an access terminal's channel request message on a specific RACH 19 will always be responded to by an immediate assignment or immediate assignment reject message from the network on the specific paired AGCH 21. The system information messages broadcast on the BCCH 5 channel also contain information elements which describe the service provider bearer services which are offered to access terminal 20 within the spot beam or cell. A GMR-1 BCCH 5 also contains a concurrent BCCH list, which is a list of BCCHs 5 being broadcast into the same spot beam 10 by the network and their services and service providers. Except for the concurrent BCCH list, all of this information or its equivalent exists in GSM. All of the information which the terminal needs to know in order to operate within the system is contained in the system information messages.

GMR-1 05.005 and GSM 05.05 partition the radio frequency spectrum available to the air interface into radio frequency channels, and defines an ARFCN for each channel. Each spot beam in GMR-1 (or cell in GSM) is allocated a subset of these channels. These channels process are defined as the beam allocation. One radio frequency channel of the beam allocation is used by the network to broadcast the BCCH and is known as the BCCH carrier.

GSM and GMR-1 use time division multiplexing (TDMA). Time is partitioned into TDMA frames and timeslots as defined in GMR-1 05.002 and GSM 05.02. The transmissions within these timeslots are known as bursts. A burst is a single unit of transmission on the radio path defined in terms of center frequency (or ARFCN), bandwidth, power profile, and duration (in numbers of contiguous timeslots).

Logical channels are mapped to physical channels by a set of multiplexing rules. They can be statically or dynamically mapped to physical channels. These rules are defined in GSM 05.02 for GSM and GMR-1 05.002 for GMR-1.

At present, the typical mobile communications satellites are non-processing satellites or bent-pipe satellites. That means that all physical bursts are transmitted or originated by a ground-based transmitter, either an access terminal 20, EGW 8 or new gateway (NGW) 12, and these are received and retransmitted by the satellite. Satellite 6 does not initiate transmission or originate physical bursts. Typically, there is a radio frequency spectrum allocated to the link between access terminal 20 and satellite 6 and another radio frequency spectrum allocated to the feeder link between satellite 6 and EGW 8. If EGW 8 transmits a burst on the feeder link, satellite 6 receives the burst and performs a frequency translation from the feeder link frequency to an appropriately allocated ARFCN and retransmits the burst on the forward link ARFCN into spot beam 10. If no feeder link burst is present satellite 6 has no signal to retransmit. Also, if access terminal 20 transmits a burst on an appropriately allocated ARFCN return link, satellite 6 receives the burst and performs a frequency translation to the appropriately allocated feeder link frequency and retransmits the burst from access terminal's 20 signal to EGW 8.

When an access terminal 20 is turned on or powered up it searches for a BCCH 5 broadcast in a spot beam 10. Since there can be hundreds of spot beams 10, the access terminal 20 must perform a task called spot beam selection. Spot beam selection in GMR-1 is described in GMR-1 specifications 03.022 and 05.008 and in U.S. Pat. No. 6,233,451, "SPOT BEAM SELECTION IN A MOBILE SATELLITE COMMUNICATION SYSTEM", (the entire contents of which are expressly incorporated herein by reference). Spot beam selection is the selecting of a BCCH carrier to "camp-on", which combines comparison and selection based on received signal strengths of BCCH carriers with a comparison and selection based on service provider or PLMN identity. Briefly, In GSM, access terminal 20 measures the power in all the BCCH carriers and selects all the ones with received signal strengths greater than some criteria and creates a rank-ordered list. The access terminal 20 then reads the system information broadcast on the BCCHs 5 of the BCCH carriers in the rank-ordered list and selects the one, which has a preferred service provider or PLMN. This is often not the closest cell or the strongest signal.

In GMR-1, in order to conserve satellite power and access terminal 20 power during communications, it is important that the access terminal 20 always select the correct spot beam. To assist the access terminal 20, two lists are broadcast in the system information of each BCCH 5, the neighbor list and the concurrent BCCH list. The neighbor list is a list of BCCH carriers used in the adjoining spot beams 10. The access terminal 20 makes measurements of these neighbors for signal strength comparison. The concurrent BCCH list is a list of all BCCH carriers in the same spot beam. These may be from a different EGW 8 or NGW 12. The concurrent BCCH List includes the PLMN ID, which is the service provider identity of the operator of the system broadcasting the concurrent BCCH. The PLMN ID is referred to as the "public land mobile network identifier" and it is composed of a mobile country code (MCC), and a mobile network code (MNC). The access terminal 20 avoids measurement comparison of concurrent BCCH carriers to make a spot beam selection, however once the access terminal 20 selects a spot beam 10, it compares PLMN identities of each BCCH 5 on the concurrent list and "camps-on" the BCCH carrier with a preferred PLMN.

As a further innovation of GMR-1, the access terminal 20 has incorporated a Global Positioning System (GPS) receiver. The system information message in the BCCH 5 also contains the latitude and longitude of the spot beam 10 center. Access terminal 20 may optionally compare its GPS position to the spot beam center position to accurately determine the correct spot beam. Since access terminal 20 is required to report this position in the channel request message, the network may optionally redirect the access terminal 20 to a different spot beam 10 based on a comparison of the reported access terminal 20 position and the coverage area map of all spot beams 10.

In order to support ubiquitous service throughout the satellite's coverage area, a gateway (EGW 8 or NGW 12) must broadcast a BCCH (BCCH 5 and BCCH 5', respectively) into every existing spot beam 10. This means that the RM 16 must allocate at least one BCCH 5 carrier for each spot beam 10 for use by the gateway RM 16. Further, satellite power must be allocated for each spot beam 10 to be illuminated by the gateway with a BCCH 5 (or BCCH 5') transmission.

Having selected a spot beam 10 and a BCCH carrier, the access terminal 20 must transmit a channel request message on the RACH 19 (or RACH 19) channel to request a traffic channel for communication of user data and/or signaling. Prior to transmitting this message, however, the access terminal 20 must make one more check. It must read the cell-bar-access bit in the system information to determine if access terminals are barred from attempting access to the cell or spot beam. If this bit is '1' access is barred and if the bit is '0' access is permitted. In the case assess is permitted, the access terminal 20 would request a channel with the establishment cause "to register". The definition of the cell bar access bit is shown in Table 1. If the user subsequently wanted to make a phone call, the access terminal 20 would request a channel for that purpose with establishment cause "to originate a call". Alternatively, someone in the PSTN might call the user, in which case, having registered with the network. the network knows the location, cell or spot beam and can page the access terminal. Upon receiving a page, the access terminal 20 transmits a channel request message with establishment cause "responding to a page." Other establishment causes exist.

TABLE I

| Cell Bar Access | Any Service |
| --- | --- |
| 1 | Barred |
| 0 | Not Barred |

In the prior art of GSM and other cellular and mobile satellite systems, the channel request message typically only contains a random reference and an establishment cause. A random reference is a unique random number generated by access terminal 20 and passed to the gateway within the RACH message, and which uniquely identifies that access terminal 20. It is used by the gateway to address access terminal 20 when sending the immediate assignment or immediate assignment reject message to access terminal 20 on the AGCH 21 (or AGCH 21'). This is used in the event of contention, between a first and second (or any number of) access terminals 20. As we have seen, the establishment cause tells the gateway the reason the access terminal 20 is requesting a channel (i.e., the reason to "establish" a channel). An innovation, introduced in the prior art of GMR-1, is for the channel request message to contain much more detailed information about the establishment cause and the requesting access terminal 20. The GMR-1 channel request message contains, in addition to the establishment cause and random reference, the SP/HPLMN ID (Service Provider/Home Public Land Mobile Network), the called party number, the GPS-derived position of the access terminal 20 and other information elements. The network reads all of these information elements and determines the disposition of the channel request message from access terminal 20. Any of the values of these information elements may trigger existing gateway (EGW) 8 to process access terminal's 20 request for access in a specific way, such as setting up a terminal-to-terminal call (described in GMR-1 specification 03.096) or optimally routing the call to another EGW 8 (described in GMR-1 specification 03.097) or rejecting the call based on geographic location, (described in GMR-1 specification 03.099) etc. None of these services are offered in GSM and there is no comparable specification.

U.S. Pat. No. 6,249,677, (the entire contents of which are herein incorporated by reference), is entitled "Apparatus and Method for Delivering Key Information of a Channel Request Message From a User Terminal to a Network" and discloses an apparatus and method, for use with the satellite-based communications network, for improving the reliability and speed at which communication between a user terminal and the network is established. The apparatus and method arranges data of a channel request message transmitted from a user terminal to a satellite in the satellite-based network to insure that the most critical data for establishing communication between the user terminal and the satellite-based network is received at the satellite during the appropriate receiving time frame window. The channel request message includes a first data group necessary for establishing a communication link for which information is transmitted between the apparatus and the network, and a second data group including information for decreasing the amount time necessary to establish the communication link. The first data group is positioned at the center of the Channel Request Message, with portions of the second data group at opposite ends of the Channel Request Message. The time at which the user terminal transmits the Channel Request Message is set based on a location of the apparatus within a spot beam, to take into account the appropriate propagation delay time for the message to travel from the apparatus to the satellite in the network, thus assuring that at least the first data group of the Channel Request Message is received at the satellite during an appropriate receiving time frame window.

FIG. 2 illustrates a message flow diagram showing the establishment of a communications channel between an access terminal and the network according to the prior art. As discussed above, EGW 8 continuously transmits BCCH 5 (step 202), which contains system information messages. In step 204, access terminal 20 "camps on" BCCH 5, and retrieves the critical system information. Included in this system information is the frequency identity of the RACH 19 channel which access terminal 20 may use to communicate with EGW 8. For example, access terminal may transmit a channel request message to EGW 8 in order to access existing services. Upon receiving the channel request message from the access terminal 20 on the RACH 19 (step 206) the network responds with either an immediate assignment or an immediate assignment reject message on the AGCH 21 (step 204). Communication on a traffic channel may then begin, as shown in step 210.

As described, in order to offer wireless mobile service, a network or system must advertise its presence and capabilities via system information messages broadcast on the BCCH 5. This broadcast costs resources to a service provider. These resources include spectrum, power as well as radio equipment. When there are two gateway stations serving the same spot beam 10, each gateway stations must use an RF carrier as the BCCH carrier and each gateway station must broadcast the BCCH 5 continuously, in order for the access terminal 20 to discover and read the system information on the BCCH 5 and access services (step 210) from the gateway. Both gateways must illuminate their BCCH carriers.

A new service provider or the existing service provider, launching a new service, is normally required to spend resources to broadcast the system information associated with the new service. In order to support ubiquitous service in the entire coverage area of the satellite system, by the prior art, the NGW 12 must broadcast a BCCH 5 in every spot beam. This requires the allocation of at least one BCCH carrier for every spot beam 10, an allocation of satellite power for every spot beam 10, and the allocation of other required system resources, such as transmitters sufficient to support the transmission of a BCCH 5 in every spot beam 10 by NGW 12. Accordingly, a need arises to allow an existing service provider, which is already providing ubiquitous service, to support by proxy a second service provider and/or a new service. Such as capability offers the opportunity to save system resources. However, a method is required, which minimizes the impact to the existing proxy network, and at the same time requires no modifications to the user access terminal 20 already using the proxy network for existing services, and minimal modifications to a new access terminal 20 and existing gateway station equipment.

FIG. 3 illustrates a state transition diagram for a GSM/GPRS mobility management software layer according to the prior art. In GPRS, GMM V.02 state machine provides two major states: GMM-Deregistered and GMM-Registered. In the design of access terminal 20, the software that controls a microprocessor, which in turn controls the transceiver and I/O functions of access terminal 20, is divided into several or more layers. Generally speaking each of these "layers" are related software code, responsible for accepting inputs (some internally generated, some externally), generating outputs (again, both internal and external) and processing received data to perform specific actions. "Layers" is a way of organizing the code, to categorize functionality to increase efficiency and economy of operation. These layers can be organized into a state transition diagram which shows expected results for specific inputs. There concepts are well known by those skilled in the art of software design. In the prior art access terminal, there is a GMM layer 301 and an RR layer 302.

A deregistered access terminal 20 will stay in a GMM-Deregistered state 302 in which access terminal 20 will not perform any routing area updates and the network will never page access terminal 20. A registered access terminal 20 will stay in GMM-Registered state 304, whereby it can initiate call/session setup, routing area update and be paged by the network. Transition between the two states are caused by events shown in FIG. 3. Implicit in all prior art systems is that spot beams always exist, and are always illuminated.

Upon power-on, GMM Layer 301 transitions from state 306 to GMM Deregistered (GMM Dereg.) PLMN Search State 308. Generally, in discussing FIG. 3, transitions from one state to another will be referred to as a "path". Transitions from a state are described with the following nomenclature: Paths are given designations representing the state of origin. For example, a first path, "path A" originating from state 310, will be referred to as "path 310A".

When GMM Layer 301 is in GMM Dereg. PLMN Search State 308, access terminal 20 is searching for PLMNs; generally, any BCCHs, but most probably an A-BCCH 9. At this point, access terminal 20 is not registered with any gateway, and that is why, as discussed above, GMM Layer 804 is described as being "de-registered". In a "deregistered" state, access terminal 20 has GPRS capability enabled, but no GMM context has been established. In this state of being "deregistered" access terminal 20 may establish a GMM context by starting the GPRS attach procedure.

Eventually, a PLMN is identified, and GMM Layer 804 transitions to either GMM Dereg. Normal Service State 310, or GMM Dereg. Limited Service State 308, via paths 308A or 308D respectively. Otherwise, GMM Dereg. PLMN Search State 308 is left when it has been concluded that no cell is available at the moment, and GMM Layer 301 transitions to GMM Dereg. No Cell Available State 336, via path 308C.

GMM Dereg. Normal Service State 310 is defined as the state to wait for operator initiated registration request. In GMR-1, registration is automatic and therefore this state has no waiting period. GMM Layer 804 transitions from GMM Dereg. Normal Service State 310, through path 310A, to GMM Dereg. Attach Needed State 312.

In GMM Dereg. Attach Needed State 312, valid subscriber data is available and for some reason a GPRS attach must be performed as soon as possible. GMM Dereg. Attach Needed State 312 is usually of no duration, but can last if the access class is blocked. An access class represents a "quality of service" indicator. That it, different access classes are established (perhaps as many as 15 or more) and users may be assigned to any one of them. The user's quality of service may depend on the access class to which it belongs.

While GMM Layer 301 is in GMM Dereg. Attach Needed State 312, GMM Layer 301 sends a message to RR Layer 303 to perform an "Attach Request"procedure, and GMM Layer 301 transitions through path 312A to GMM Registered (GMM Reg.) Initiated State 316. GMM Reg. Initiated State 316 is an "in-between" state—neither de-registered as in state 302, nor registered as in state 304.

In GMM Reg. Initiated State 316, a GPRS attach procedure has been started and access terminal 20 is waiting a response from the network. There can be several outcomes to this request. First, if the attempt to attach is rejected, GMM Layer 301 transitions to GMM Dereg. Attempting to Attach State 314 via path 316A. GMM Dereg. Attempting to Attach State 314 represents the condition in which no GMM Layer 301 procedure will be initiated except a GPRS Attach. The execution of further attach procedures depends on the GPRS attach procedure counter. However, while GMM Layer 301 is in GMM Dereg. Attempting to Attach State 314, there are several other possible transitions that might also occur.

GMM "registered" defines a set of states in which a GMM context has been established, i.e. the GPRS attach procedure has been successfully performed. In these states, access terminal 20 may activate PDP contexts, send and receive user data and signaling information, and may reply to a page request. Furthermore, cell and routing area updating are performed.

GMM Registered Normal Service State 318 is the state in which user data and signaling information may be sent and received. In GMM Registered Update Needed State 320, access terminal 20 has to perform a routing area updating procedure, but its access class is not allowed in the cell. The procedure will be initiated as soon as access is granted (this might be due to a cell-reselection or due to change of the barred access class of the current cell). No GMM procedure except routing area updating shall be initiated by access terminal 20 in GMM Registered Update Needed State 320. Additionally, while in GMM Registered Update Needed State 320, no user data and no signaling information shall be sent.

After transitioning to GMM Reg. Update Needed State 320, GMM Layer 804 causes a Routing Area Update (RAU) request to be issued, and this places GMM Layer 804 in GMM Routing Area Update Initiated State 322. Note that similarly to GNM Registered Initiated State 316, GMM Routing Area Update Initiated State 322 is neither registered 304 nor deregistered 302, but, "in-between." GMM Routing Area Update Initiated State 322 is the state in which a routing area update procedure has been stated and access terminal 20 is awaiting a response from the network.

Following the request, access terminal 20 is involved in communications with NGW 12, and enters GMM Reg. Attempting to Update State 324, via path 322A. GMM Reg. Attempting to Update State 324 may be described as the condition in which a routing area updating procedure has failed due to a missing response from the network. Similar to attach procedure, access terminal 20 retries the procedure controlled by timers and a GMPRS attempt counter. No GMM procedure except routing area updating shall be initiated by access terminal 20 while in this state. No data shall be sent or received.

GMM layer 301 may leave GMM routing area update initiate state 322 via path 322B, if the RAU is accepted or if the RAU counter is less than five (5), a failure case occurs and the current RAI equals the stored RAI. If those conditions are true, GMM Layer 804 proceeds, via path 322B, to GMM Reg. Normal Service State 318.

GMM Layer 301 may leave GMM Reg. Normal Service state 310 for several reasons. First, if n/w initiates a detach received with reattach, GMM Layer 301 transitions to GMM Dereg. Attempting To Attach State 314 via path 318B. Second, if n/w initiates a detach received without reattach implicit detach, GMM Layer 301 will transition to GMM Dereg. Normal Service State 310 via path 318C. And lastly, if access terminal originates a detach request, GMM layer 301 will transition to GMM Dereg. Initiated State 326, via path 318D. Once at GMM Dereg. Initiated State 326, GMM layer 301 will transition to GMM Dereg. Normal/Service State 310 via path 326B if the detach request is accepted.

SUMMARY OF THE INVENTION

The above described disadvantages are overcome and a number of advantages are realized by the present invention which relates to a system and method to facilitate providing a new service by a new service provider to existing user access terminal of an existing service provider; wherein the existing gateway may trigger the providing of these new services by either a specific request by the user terminal or by the existence of specific information, including the user terminal's establishment cause, SP/HPLMN ID or even its GPS position.

It is therefore object of the invention to provide a system and method to facilitate providing a new service to new user access terminal of both established and new service providers.

It is a further object of the invention to provide a system and method to efficiently provide access for new user access terminal to new services without requiring the new service provider to acquire its own satellite transmission resources.

It is therefore an object of the invention to provide a system and method to automatically trigger the illumination of a dark beam based on specific values of information elements contained in a channel request message, transmitted by a user.

It is therefore an additional object of the invention to provide a system and method to deactivate and de-illuminate an illuminated beam based on specific criteria.

It is therefore an additional object of the invention to provide a system and method to provide a mechanism for enabling successful illumination of a dark beam by a user, by way of an extended pause timer and an illumination retry timer.

It is therefore an additional object of the invention to provide a system and method to provide an interface between an existing gateway and a new gateway.

It is therefore an additional object of the invention to provide a system and method to provide an additional mechanism, a cell bar access flag, for use in the illumination of a dark beam by a user.

These and other objects of the invention are provided by a method for operating a software layer in a user's access terminal in a satellite based telecommunications systems, comprising the steps of entering a deregistered state from a power-off state, initiating an attach request procedure from an access terminal to an existing network, identifying a PLMN of a first broadcast channel, camping on the first broadcast channel, establishing deregistered service with a first network through use of the first broadcast channel, and entering a registered illuminated state if a dark beam is illuminated and entering a deregistered dark beam state if the dark beam is not illuminated, and engaging in telecommunication activities with a new network while in the registered illuminated dark beam state.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, in which:

DETAILED DESCRIPTION OF THE PREFERRED EMBODIMENT

Figure 1:
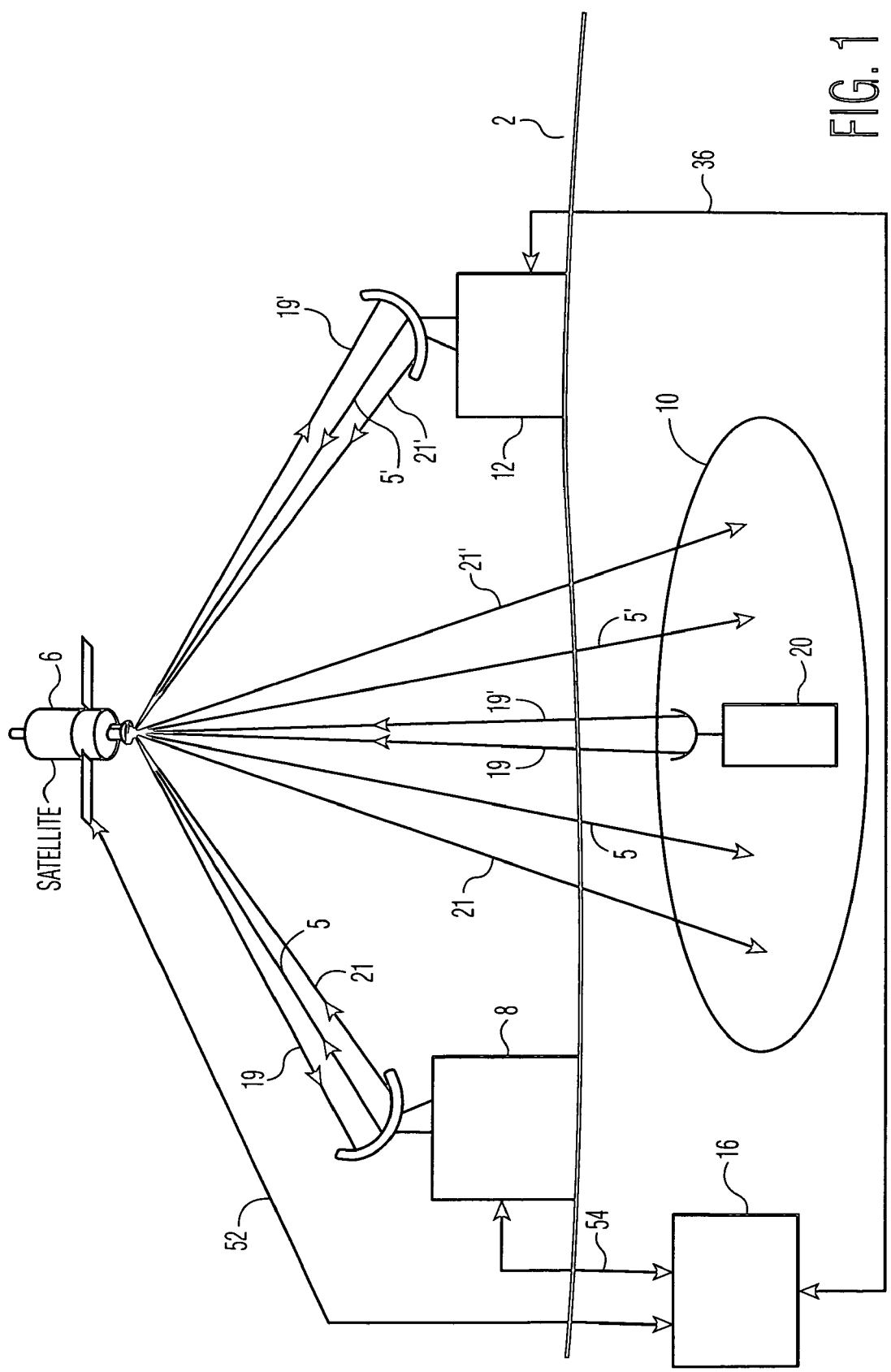
FIG. 1 illustrates a block diagram of a satellite communication system according to the prior art.
Figure 2:
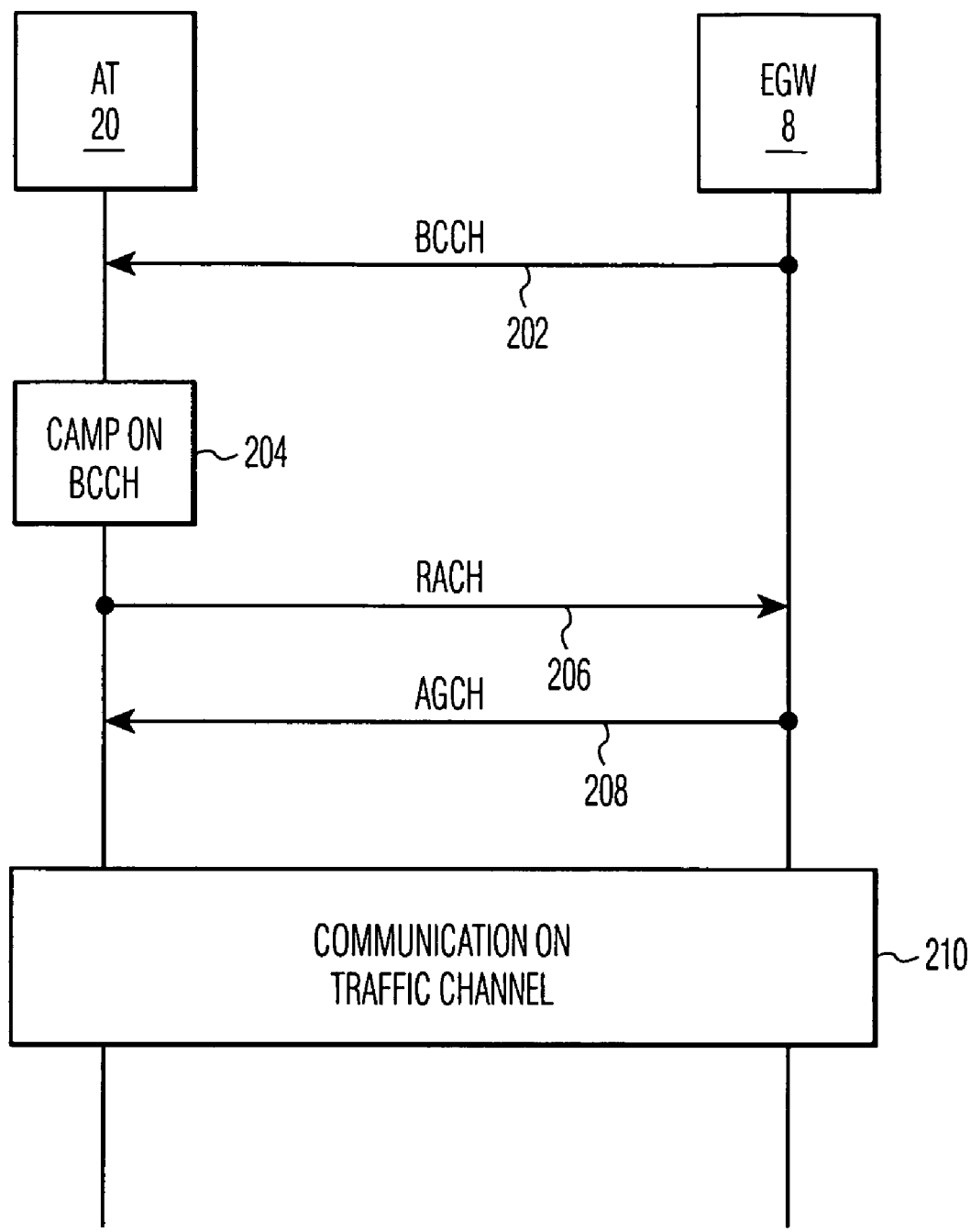
FIG. 2 illustrates a message flow diagram showing the establishment of a communications channel between an access terminal and the network according to the prior art.
Figure 3:
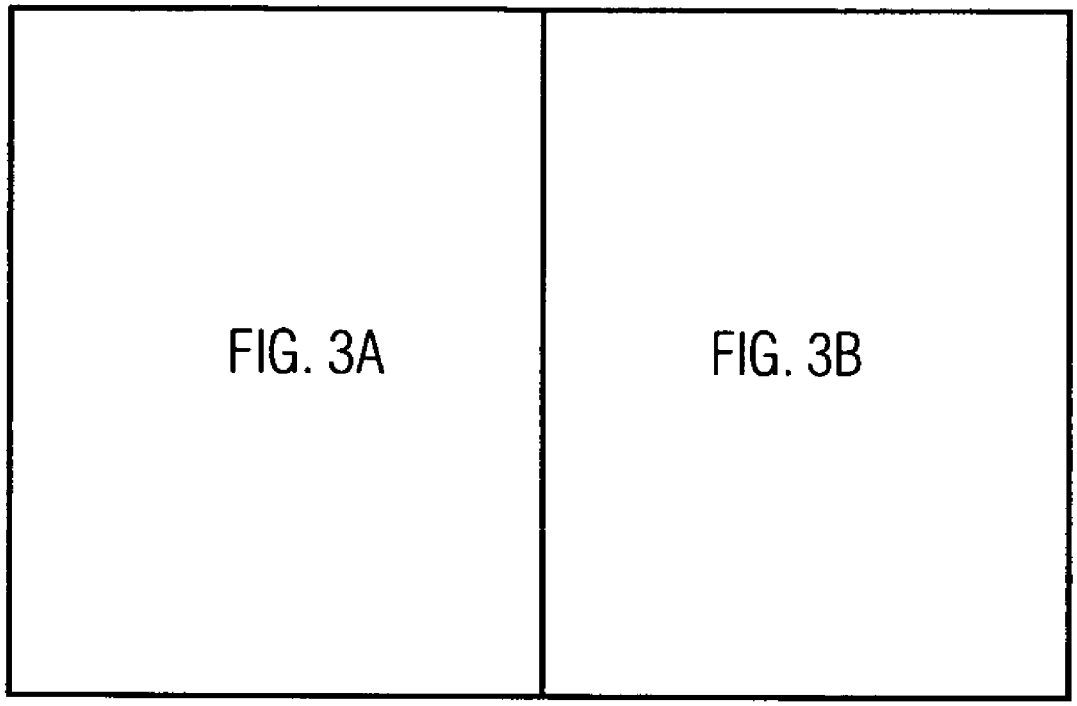
FIG. 3 illustrates a state transition diagram for a GSM/GPRS mobility management software layer according to the prior art.
Figure 3A:
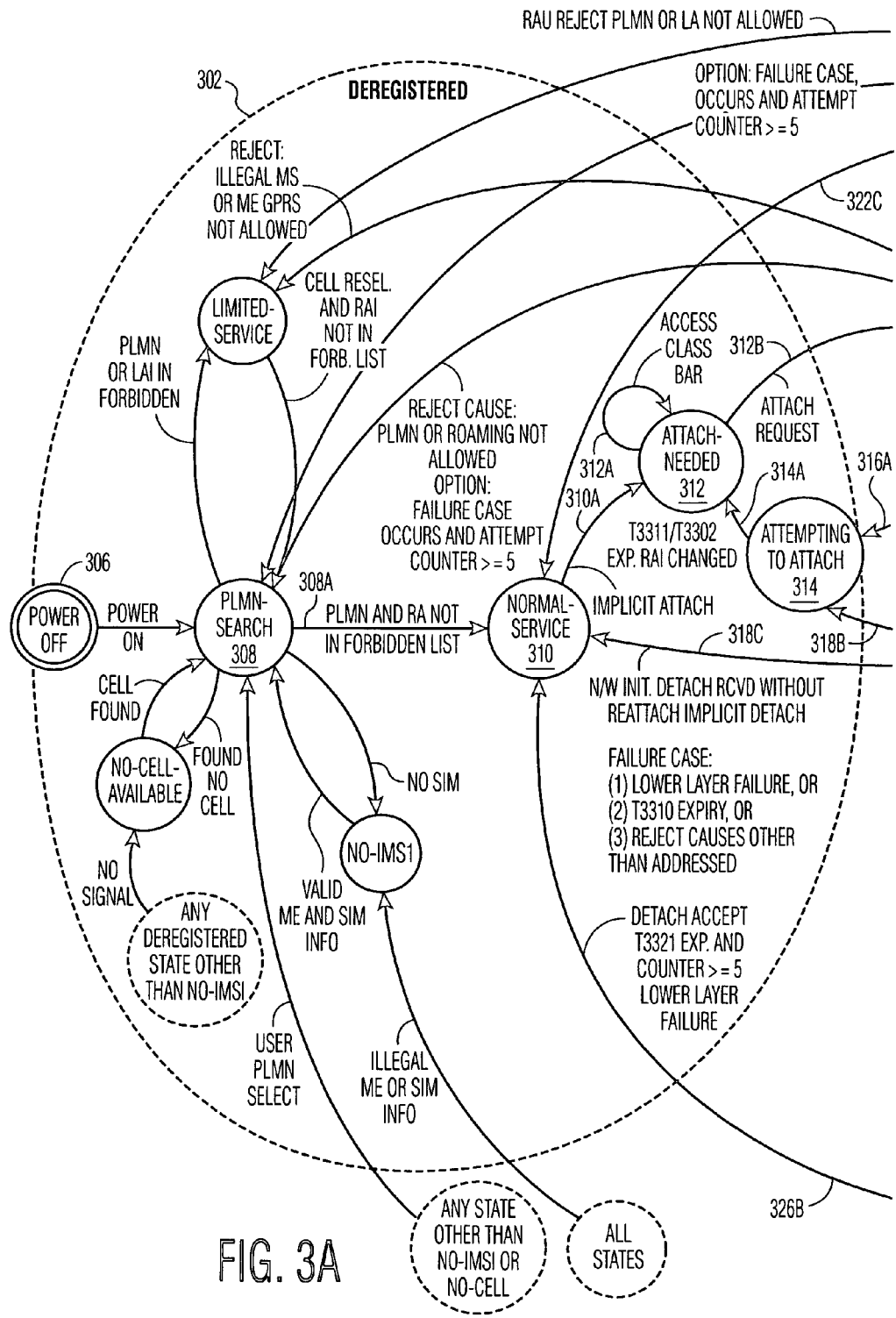
Figure 3B:
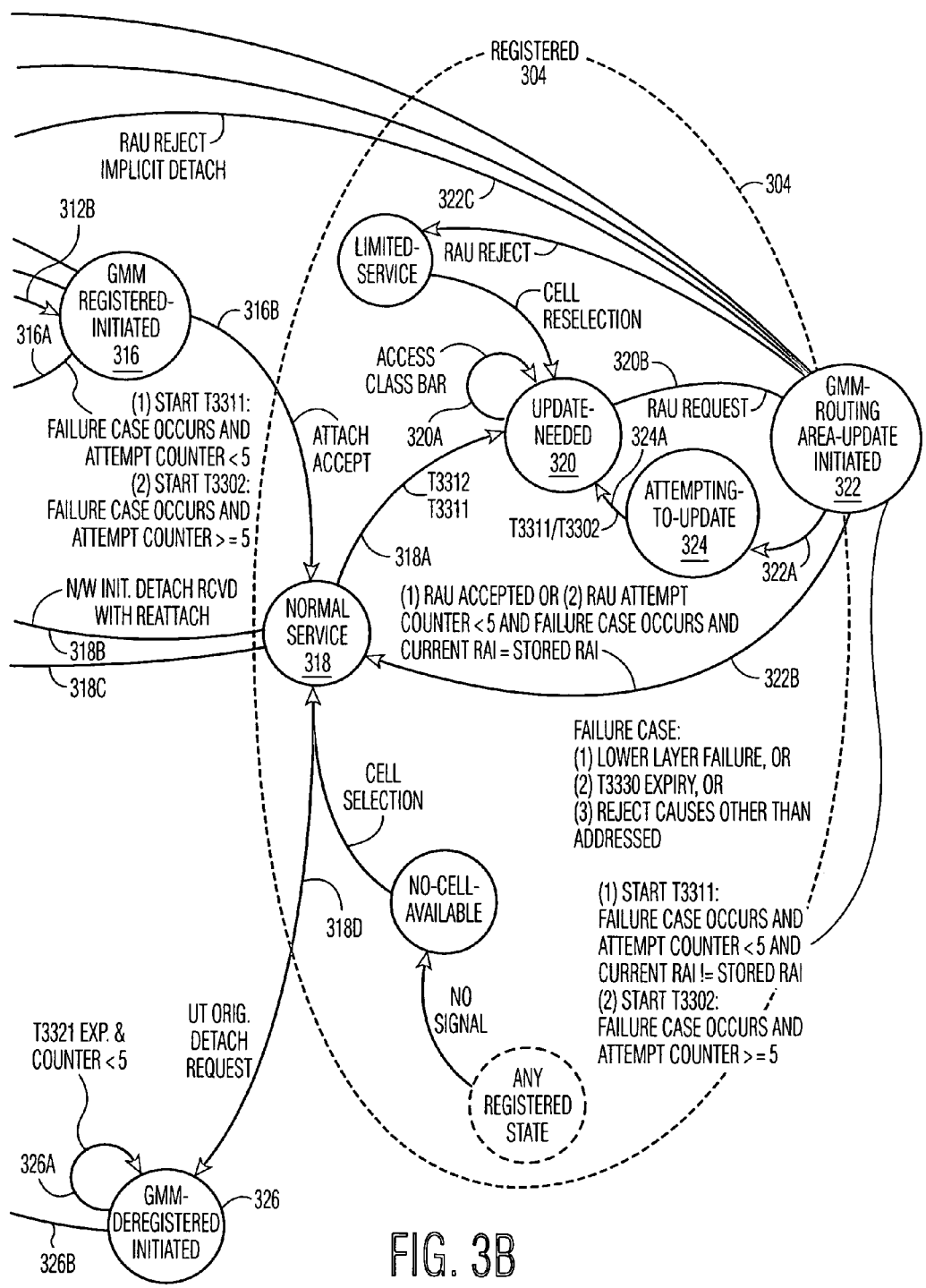

The various features of the preferred embodiment will now be described with reference to the figures, in which like parts are identified with the same reference characters.

The following detailed description of the preferred embodiment is related to two co-pending applications: "DARK BEAM OPERATION SCENARIO", A. Noerpel, et al., Ser. No. 10/183,838; and "A. MOBILITY MANAGEMENT-RADIO RESOURCE LAYER INTERFACE SYSTEM AND METHOD FOR HANDLING DARK BEAM SCENARIOS," A Noerpel, et al., Ser. No. 10/185,256, the entire contents of both being expressly incorporated herein by reference.

Figure 4:
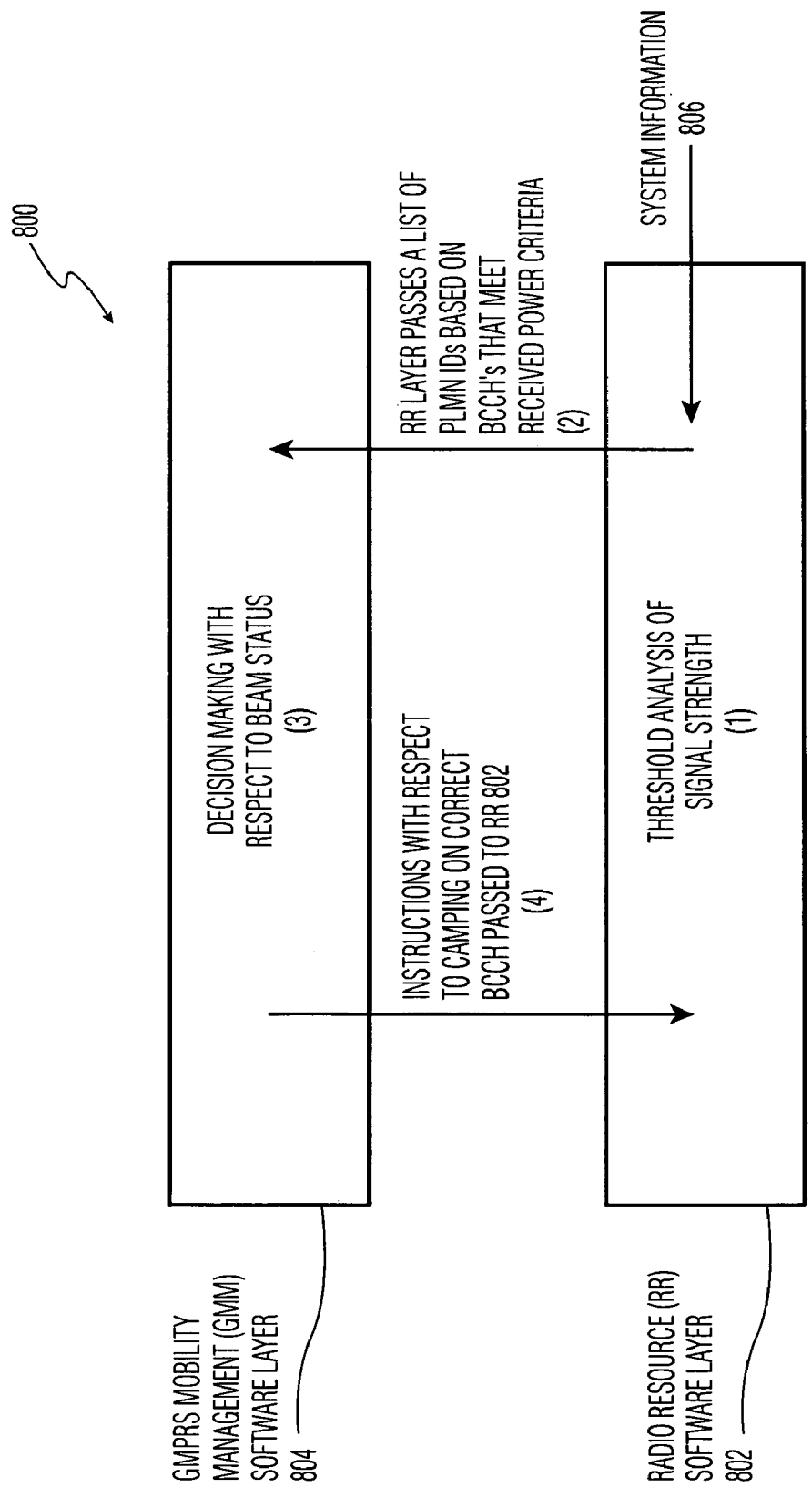
FIG. 4 illustrates a signal flow diagram showing the interaction between GMPRS mobility management software layer and radio resource software layer of an access terminal in accordance with an embodiment of the invention.

FIG. 4 illustrates a signal flow diagram showing the interaction between GMPRS mobility management software layer and radio resource software layer of an access terminal in accordance with an embodiment of the invention. FIG. 4 shows generally how the two software layers, radio resource software layer (RR layer) 802 and GMPRS mobility management layer (GMM layer) 804 have been designed into access terminal 20. Generally, RR layer 802 receives or monitors all available channels, measuring signal strength on any channels showing activity (i.e., presence of a signal). Thus, RR layer 802 performs threshold analysis for all BCCH signals that are present (shown as step (1)). When a received signal's parameters exceed established power criteria, RR layer 802 passes the included system information to GMM layer 804 (shown as step (2)), in the form of a list of PLMN IDs. GMM layer 804 then makes decisions regarding beam illumination status (shown as step (3)), and provides instructions to RR layer 802 (shown as step (4)) to camp on the correct BCCH (T-BCCH 11 (dark beam scenario) or A-BCCH 9).

Access terminal 20 provides users with several features that are transparent to the user; that is, these are features that are a direct result of the design of RR layer 802 and GMM layer 804. These features will be briefly discussed, then the design of the two layers will be discussed in greater detail.

RR layer 802 and GMM layer 804 provide users with the following features:

1. Prioritization of Accessible Spot Beams (RR Function).

A dark beam may have no accessibility for packet users due to various reasons. This is indicated by the combination of Cell Bar Access Flag SIE 40 and Cell Bar Extension Flag SIE 42 transmitted in the corresponding A-BCCH 9. Access terminal 20 should not camp on a non-accessible A-BCCH 9 unless there is no accessible A-BCCH 9 available. Therefore, access terminal 20 must check Cell Bar Access Flag SIE 40 before doing anything else.

2. Routing Area Update (RAU) Procedure (GMM Function).

A routing area update (RAU) procedure is used to periodically inform the network that access terminal 20 is still "alive", i.e., still functioning in the area, and desirous of communicating in the network. If access terminal 20 does not inform the network it is interested, the network will never page access terminal 20 when downlink data becomes available. Additionally, whenever access terminal 20 changes from one routing area to another, due to user mobility, a RAU procedure is used to inform the network about it its new location so that the network knows where to page access terminal 20 the next time data is available for it. When access terminal 20 is in a dark beam, it should not perform a RAU procedure at the expiry of RAU timer or a change of routing area.

3. Registration Issue (GMM Function).

In a dark beam, access terminal 20, after power on, should automatically initiate an attach procedure as a preliminary step in attempting to illuminate the dark beam. An attach procedure is a preliminary step that registers an access terminal 20 with a network. As a result, the user does not have to manually register himself before initiating a service request (i.e., the method described in related application, Ser. No. 10/183,838, entitled " DARK BEAM OPERATION SCENARIO.").

4. Change of Beam Illumination Status (Combination of GMM and RR Function).

If a dark beam becomes illuminated, all de-registered access terminals 20 shall initiate an Attach Procedure to EGW 8 to register themselves. All registered access terminals 20 whose RAU timers have been expired or whose routing area identity (RAI) has been changed shall perform a RAU Procedure to update their status on the network. An RAI is utilized for paging purposes. Paging occurs when EGW 8 wishes to communicate with access terminal 20, so it verifies the location of access terminal 20 with a paging process. The RAI is an identifier created and used by access terminal 20 to inform EGW 8 of its location. This is done whenever access terminal 20 enters a new spot beam (as discussed above) or when its RAU timer expires.

If an illuminated beam becomes dark, access terminal 20 shall camp on an A-BCCH 9 of EGW 8. The change of selected network shall not trigger access terminal 20 to initiate an attach procedure or RAU procedure to the new network.

Figure 5:
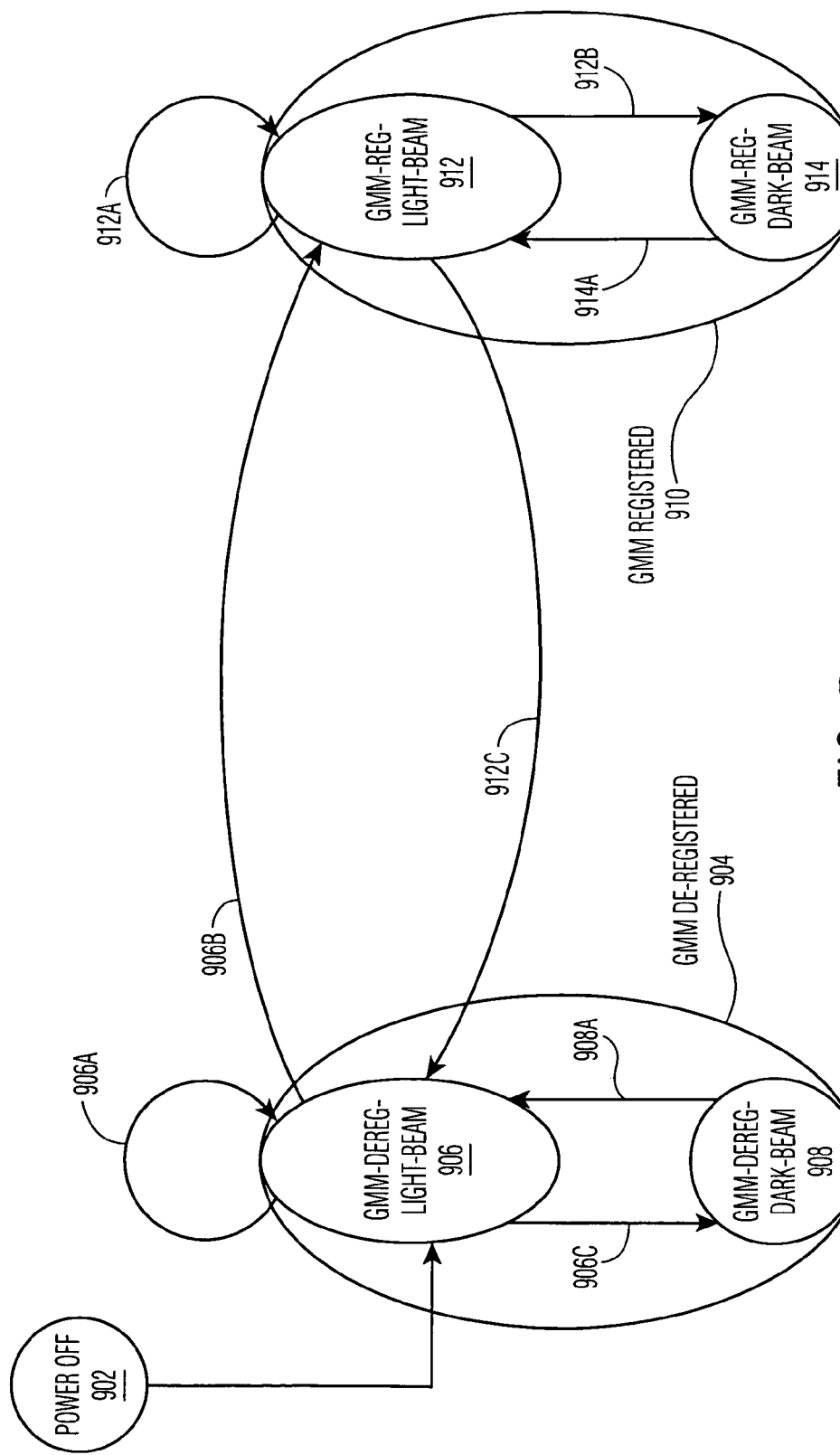
FIG. 5 illustrates a simplified state transition diagram for a GMPRS mobility management software layer according to an embodiment of the invention.
Figure 6:
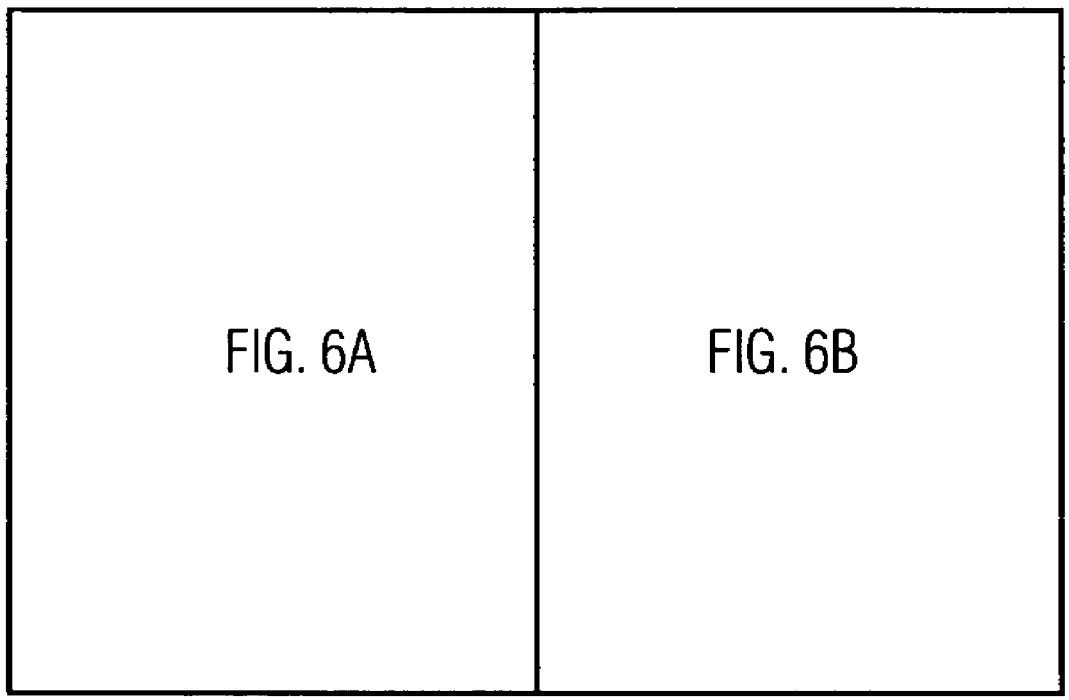
FIG. 6 illustrates a detailed state transition diagram for a GMPRS mobility management software layer according to an embodiment of the invention.
Figure 6A:
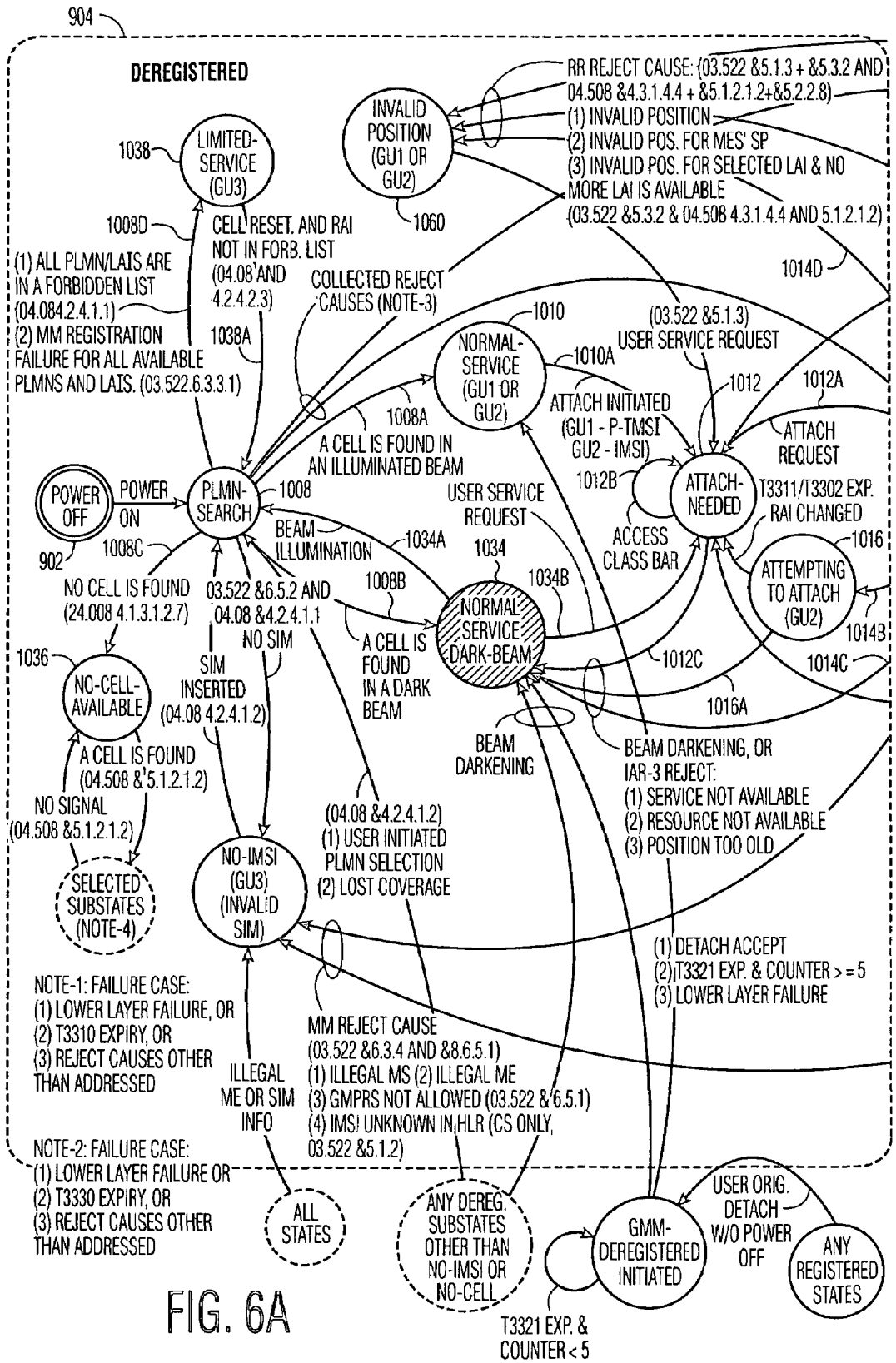
Figure 6B:
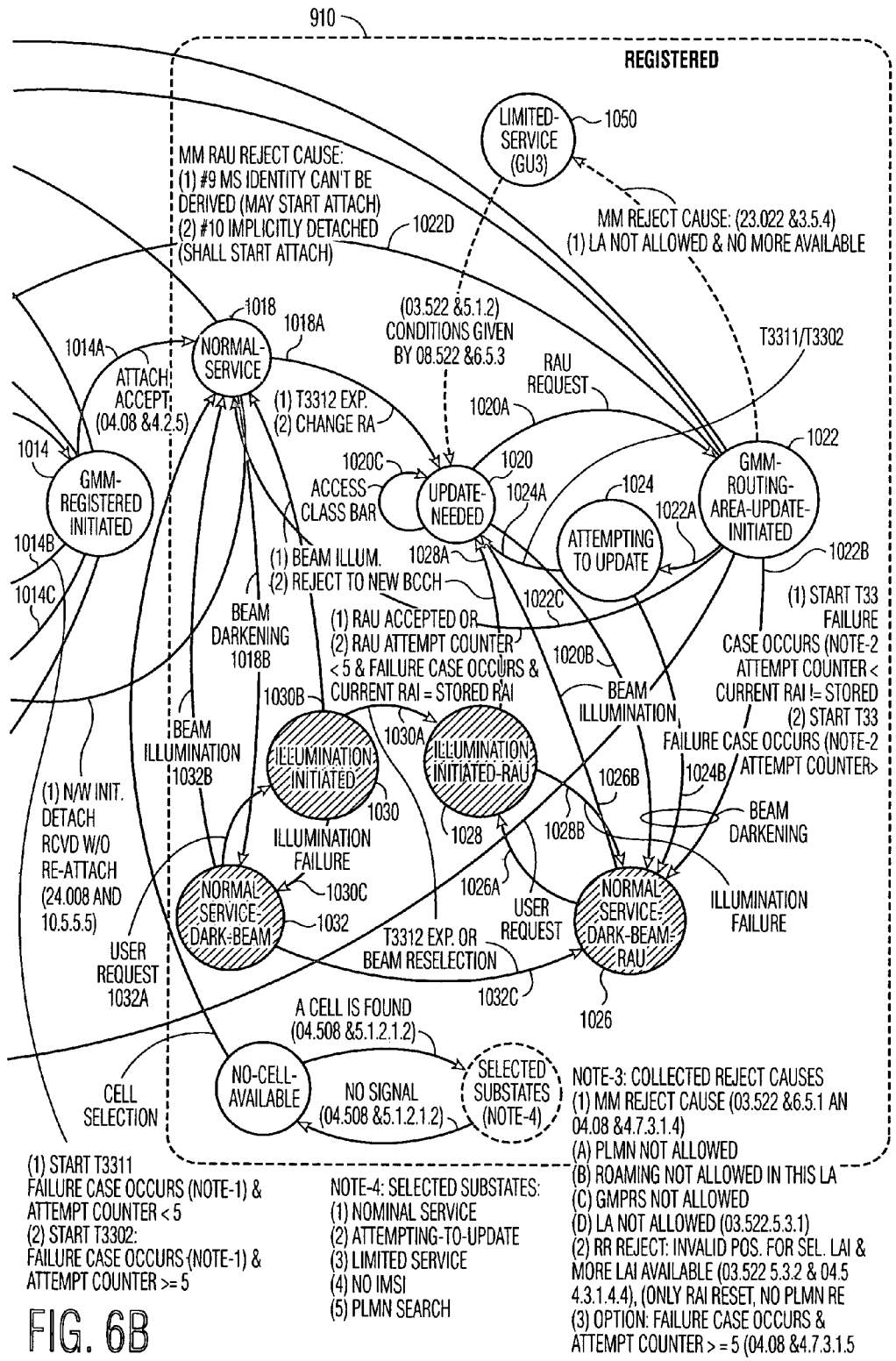

FIG. 5 illustrates a simplified state transition diagram for a GMPRS mobility management software layer according to an embodiment of the invention. In GMR-1, two more states have been added: GMM-Deregistered-Dark-Beam and GMM-Registered-Dark-Beam. The most significant new state is GMM-Registered-Dark-Beam in which the access terminal's 20 behavior is similar to GMM-Deregistered but it will never update its routing area. In general, access terminal 20 GMM layer 804 will utilize the standard GMPRS protocol stack with necessary updates in order to accommodate a beam darkening situation. When a darkened beam becomes illuminated, GMM layer 804 will follow standard procedures that have previously been used. These include the aforementioned procedures of Attach/Detach, Routing Area Update (RAU), Periodical Location Registration. In a dark beam, access terminal 20 will not perform any of the operations mentioned above that tell the network where access terminal 20 is. These are not performed because there is no requirement to perform downlink data transfer in dark beam, thereby saving frequency/subband resources, even though the triggering condition is already met. The trigger for Periodic Location Registration is timer expiry or access terminal 20 moving from one beam to another. As a result, GMM layer 804 sub-states have been created to describe what occurs in GMM layer 804 during a beam darkening event, as shown in FIGS. 5 and 6. Although FIG. 6 will be discussed in detail below, during the ensuing discussion of FIG. 5, reference will be made to the several states of FIG. 6 that correlate to that states of FIG. 5. FIG. 5 is, as mentioned above, a simplified version of FIG. 6.

Upon power-up, in step 902, access terminal 20 enters GMM De-registered state 904. The terms "de-registered" and "registered" refer to the state of access terminal 20 in relation to acquiring service from NGW 12: IF NGW 12 has knowledge of access terminal 20, then access terminal 20 is "registered" with NGW 12, and can acquire service. If NGW 12 does not have knowledge of access terminal 20, then access terminal 20 is in a state of being "de-registered". The process of registration will only occur if a beam is illuminated when access terminal 20 enters spot beam 10 (as discussed below), or becomes illuminated while waiting for the illuminating event while in spot beam 10. Stricter definitions of "registered and deregistered" are given in reference to the discussion of FIG. 6.

Regardless of beam illumination status, access terminal 20 enters GMM Dereg-Light-Beam sub-state 906 (in reference to FIG. 6, all the states of deregistered state 904 of FIG. 6 are contained in GMM-Dereg-Light-Beam state 906, except for State 1034; State 1034 is equivalent to GMM-Dereg-Dark-Beam state 908 of FIG. 5). By doing so, an Attach Request Procedure (i.e. a channel request) is automatically initiated to the selected network. This is caused by access terminal 20 transmitting Establishment Cause IE 44 on RACH 19, using Channel Request Message 13, with Attach/RAU Request ECV 45. The selected network in this instance is that network which access terminal 20 desires the new service from, i.e., NGW 12. If the beam is illuminated triggered by Attach Request message sent from the access terminal 20, then the attach request is sent to NGW 12. The successful attach leads GMM layer 804 to transition to GMM-Reg-Light-Beam sub-state 912 (which is part of GMM Registered state 910) in via path 906B.

If the Attach Request does not result in beam illumination due to lack of radio resource, access terminal 20 GMM layer 804 transitions to GMM-Dereg-Dark-Beam sub-state 908, in via path 906C, and performs idle mode access terminal 20 activities. If, however, the beam is illuminated due to the triggering of the Attach Request message, access terminal 20 is redirected to T-BCCH 11. This will trigger GMM layer 804 in GMM-Dereg-Light-Beam sub-state 906 to initiate another Attach Request Procedure to NGW 12. A successful Attach Request Procedure will lead GMM layer 804 to transition to GMM-Reg-Light-Beam sub-state 912 via path 906B, as discussed above ("path" 906B actually corresponds to state 1014 of FIG. 10; this is an "in-between" state, where access terminal 20 is neither registered, nor deregistered).

If while in GMM-Dereg-Dark-Beam sub-state 908 the beam is illuminated due to other user's activity, GMM layer 804 will transition back to GMM-Dereg-Light-Beam sub-state 906 via path 908A and an Attach Request Procedure is automatically initiated. A successful Attach Request Procedure will lead GMM layer 804 to transition to GMM Registered State 910 and GMM-Reg-Light-Beam sub-state 912 via path 906B, as discussed above.

While in GMM-Reg-Light-Beam sub-state 912, various activities can be performed, including packet data profile (PDP) context activation (establishing packet date profile), RAU (routing area update), Service Request (wherein access terminal 20 asks for data transfer service) and Answering-to-Paging (in case the network has data to deliver to access terminal 20 the network will first page access terminal 20, which should then answer the paging). These are all shown as performed via path 912A. If access terminal 20 is in idle mode, it will perform idle mode activities as described above.

However, at some certain point, the illuminated beam will become dark. The beam darkening event will trigger GMM layer 804 to transition from GMM-Reg-Light-Beam sub-state 912 to GMM-Reg-Dark-Beam sub-state 914 via path 912B (in reference to FIG. 10, four states of FIG. 10 correlate to GMM-Reg-Dark-Beam state 914: States 1026, 1028, 1030 and 1032; the balance correlate to GMM-Reg-Light-Beam state 912 of FIG. 9). If GMM layer 804 of access terminal 20 is occupying GMM-Reg-Dark-Beam sub-state 914, and a beam illumination event occurs, GMM layer 804 transitions to GMM-Reg-Light-Beam sub-state 912 via path 914A. An RAU Procedure will be initiated if either access terminal 20 periodic RAU timer has expired or RAI has been changed since the last time attached request procedure or RAU has been performed.

Finally, while in GMM-Reg-Light-Beam sub-state 912, access terminal 20 may decide to, or be forced to "detach" itself from the new services provided by NGW 12. This could occur as a result of an explicit detach request, an implicit detach request, an RAU procedure failure, or RAU resulting in a finding of an "indeterminate" (or invalid) position. Regardless of the exact reason, when access terminal 20 leaves GMM registered state 910 (GMM-Reg-Light-Beam sub-state 912) it does so via path 912C, and enters GMM deregistered state 904. As a result, access terminal 20 is no longer registered with NGW 12, and enters GMM-Dereg-Light-Beam sub-state 906.

FIG. 6 illustrates a detailed state transition diagram for a GMPRS mobility management software layer according to an embodiment of the invention. FIG. 6 explains in greater detail the operations of FIG. 5. Upon poweron, GMM Layer 804 transitions from state 902 to GMM Deregistered (GMM Dereg.) PLMN Search State 1008. Generally, in discussing FIG. 6, transitions from one state to another will be referred to as a "path". Transitions from a state are described with the following nomenclature: Paths are given designations representing the state of origin. For example, a first path, "path A" originating from state 1010, will be referred to as "path 1010A".

When GMM Layer 804 is in GMM Dereg. PLMN Search State 1008, access terminal 20 is searching for PLMNs; generally, any BCCHs, but most probably an A-BCCH 9. At this point, access terminal 20 is not registered with any gateway, and that is why, as discussed above in reference to FIG. 9, GMM Layer 804 is described as being "de-registered". In a "deregistered" state, access terminal 20 has GPRS capability enabled, but no GMM context has been established. In this state of being "deregistered" access terminal 20 may establish a GMM context by starting the GPRS attach procedure. It is while in PLMN Search State 1008 that access terminal 20 exercises the protocol methods described in related application Ser. No. 10/183,838 entitled "DARK BEAM OPERATION SCENARIO."

Eventually, a PLMN is identified, and GMM Layer 804 transitions to either GMM Dereg. Normal Service State 1010, or GMM Dereg. Limited Service State 1038, via paths 1008A or 1008B respectively. Otherwise, GMM Dereg. PLMN Search State 1008 is left when it has been concluded that no cell is available at the moment, and GMM Layer 804 transitions to GMM Dereg. No Cell Available State 1036, via path 1008C.

GMM Dereg. Normal Service State 1010 is defined as the state to wait for operator initiated registration request. In GMR-1, registration is automatic and therefore this state has no waiting period. GMM Layer 804 transitions from GMM Dereg. Normal Service State 1010, through path 1010A, to GMM Dereg. Attach Needed State 1012.

In GMM Dereg. Attach Needed State 1012, valid subscriber data is available and for some reason a GPRS attach must be performed as soon as possible. GMM Dereg. Attach Needed State 1012 is usually of no duration, but can last if the access class is blocked. An access class represents a "quality of service" indicator. That it, different access classes are established (perhaps as many as 15 or more) and users may be assigned to any one of them. The user's quality of service may depend on the access class to which it belongs. If a dark beam indication is received GMM Layer 804 will transition to GMM Dereg. Normal Service Dark Beam State 1034 via path 1012C.

GMM Dereg. Normal Service Dark Beam State 1034 represents the situation in which access terminal 20 is attempting an attach or a detach procedure which could not be completed due to dark beam indication. GMM Dereg. Normal Service Dark Beam State 1034 ends when access terminal 20 receives a trigger from upper layers (i.e., from GMM layer 804 to RR layer 802), or a light beam indication (i.e., a dark beam is illuminated) and GMM Layer 804 transitions to GMM Dereg. Normal Service State 1010 through GMM Dereg. PLMN Search State 1008 via paths 1034A and 1008A.

While GMM Layer 804 is in GMM Dereg. Attach Needed State 1012, GMM Layer 804 sends a message to RR Layer 802 to perform an "Attach Request" procedure, and GMM Layer 804 transitions through path 1012A to GMM Registered (GMM Reg.) Initiated State 1014. GMM Reg. Initiated State 1014 is an "in-between" state—neither de-registered as in state 804, nor registered as in state 810.

In GMM Reg. Initiated state 1014, a GPRS attach procedure has been started and access terminal 20 is waiting a response from the network. If a dark beam indication is received before a peer level response from the network indicating lack of resources, GMM Layer 804 will transition to GMM Dereg. Normal Service Dark Beam State 1034 via path 1014C. If a status indication is received from RR Layer 802, with a cause indicating "Switch to new BCCH", GMM Layer 804 will transition to GNM Dereg. PLMN Search State 1008, via path 1014C (to GMM Dereg. Normal Service Dark Beam State 1034 and then through path 1034A to GMM Dereg. PLMN Search State 1008). RAU Timer (T3310) will be stopped.

In GMM Reg. Initiated State 1014, access terminal 20 (more specifically, RR Layer 802) waits for a network to respond. There can be several outcomes to this request. First, if the attempt to attach is rejected, GMM Layer 804 transitions to GMM Dereg. Attempting to Attach State 1016 via path 1014B. GMM Dereg. Attempting to Attach State 1016 represents the condition in which no GMM Layer 804 procedure will be initiated except a GPRS Attach. The execution of further attach procedures depends on the GPRS attach procedure counter. However, while GMM Layer 804 is in GMM Dereg. Attempting to Attach State 1016, there are several other possible transitions that might also occur.

Second, if a beam darkening event occurs, or an Immediate Assignment Reject Message 15 is received GMM Layer 805 will transition to GMM Dereg. Normal Service Dark Beam State 1034. There are several error cases that the Immediate Assignment Reject Message (response from the network) can contain that will cause this last transition: the first is Non Availability of Satellite Resource RCV 37, (resource not available); second is non-availability of services and third is "position too old."

Third, if a status indication is received (i.e., Immediate Assignment Reject Message 15) from RR Layer 802 with Switch to New T-BCCH reject cause value, GMM Layer 804 will transition to GMM Dereg. PLMN Search State 1008, via path 1016A (to GMM Dereg. Normal Service Dark Beam State 1034) and then via path 1034A to GMM Dereg. PLMN Search State 1008.

Fourth, if the routing area update (RAU) timer expires, GMM Layer 804 will transition to GMM Reg. Update Needed State 1020, via path 1016B, to GMM Dereg. Attached Needed State 1012 (where the Attach is attempted), to GMM Dereg. GMM Registered Initiated State 1014 via path 1012A, and then to GMM Reg. Normal Service State 1018 via path 1014A, and finally to GMM Reg. Update Needed State 1020 (where the RAU process can begin), via path 1018A.

GMM "registered" defines a set of states in which a GMM context has been established, i.e. the GPRS attach procedure has been successfully performed. In these states, access terminal 20 may activate PDP contexts, send and receive user data and signaling information, and may reply to a page request. Furthermore, cell and routing area updating are performed.

GMM Registered Normal Service State 1018 is the state in which user data and signaling information may be sent and received. On receiving a dark beam indication, GMM Layer 804 will transition to GMM Registered Normal Service Dark Beam State 1032.

In GMM Registered Update Needed State 1020, access terminal 20 has to perform a routing area updating procedure, but its access class is not allowed in the cell. The procedure will be initiated as soon as access is granted (this might be due to a cell-reselection or due to change of the barred access class of the current cell). No GMM procedure except routing area updating shall be initiated by access terminal 20 in State 1020. Additionally, while in State 1020, no user data and no signaling information shall be sent. On receiving a dark beam indication GMM Layer 804 will transition to GMM Registered Normal Service Dark Beam Routing Area Update State 1026 via path 1020B.

After transitioning to GMM Reg. Update Needed State 1020, GMM Layer 804 causes a Routing Area Update (RAU) request to be issued, and this places GMM Layer 804 in GMM Routing Area Update Initiated State 1022. Note that similarly to GMM Registered Initiated State 1014, GMM Routing Area Update Initiated State 1022 is neither registered (904) nor deregistered (910), but "in-between." GMM Routing Area Update Initiated State 1022 is the state in which a routing area update procedure has been stated and access terminal 20 is awaiting a response from the network. If a dark beam indication is received before a response from the network, access terminal 20 will transition to GMM Registered Normal Service Dark Beam RAU State 1026 via path 1022B. Timer T3330 will be stopped, the attempt counter will not be incremented, and the GU Status will not be changed.

Following the request, access terminal 20 is involved in communications with NGW 12, and enters GMM Reg. Attempting to Update State 1024, via path 1022A. GMM Reg. Attempting to Update State 1024 is described by the condition in which a routing area updating procedure has failed due to a missing response from the network. Similar to attach procedure, access terminal 20 retries the procedure controlled by timers and a GMPRS attempt counter. No GMM procedure except routing area updating shall be initiated by access terminal 20 while in this state. No data shall be sent or received.

If the beams darkens at this time, then GMM Layer 804 transitions from GMM Reg. Attempting to Update State 1024, to GMM Reg. Normal Service Dark Beam RAU State 1026 via path 1024B. Else, if the beam stays illuminated, GMM Layer 804 will remain in GMM Reg. Attempting to Update State 1024, until another RAU update is needed, or the beam goes dark, or the user no longer desires new services from NGW 12.

GMM Reg. Normal Service Dark Beam State 1032 is the state in which the GMM Layer 804 shall enter (via path 1018B) upon receiving a dark beam indication when in GMM Reg. Normal Service State 1018. No user data and signaling shall be sent by access terminal 20 when in GMM Reg. Normal Service Dark Beam State 1032. GMM Layer 804 will remain in this GMM Reg. Normal Service Dark Beam State 1032 until a trigger is received to send user data, the RAI timer (T3312) expires or a light beam indication is received. On receiving a light beam indication GMM Layer 804 will transition to GMM Reg. Normal Service State 1018 via path 1032B. If a trigger is received to send user data GMM Layer 804 will transition to GMM Reg. Illumination Initiated State 1030. On expiry of the RAI Timer (T3312), GMM Layer 804 will transition to GMM Reg. Normal Service Dark Beam RAU State 1026.

GMM Reg. Illumination Initiated State 1030 is the state GMM Layer 804 shall enter when it receives a trigger to send user data while in GMM Reg. Normal Service Dark Beam State 1032. User data is buffered in this state until a light beam or dark beam indication is received or RAI timer (T3312) expires. On receiving a light beam indication or a status indication (Immediate Assignment Reject Message 15) from the lower layers with a reject cause indicating Switch to new T-BCCH RCV 35, GMM Layer 804 will transition to GMM Reg. Normal Service State 1018, via path 1030B, and send the buffered data. If a dark beam indication is received, access terminal will discard buffered data and return to GMM Reg. Normal Service Dark Beam State 1032 via path 1030C. On expiry of RAI Timer (T3312) GMM Layer 804 will transition to GMM Reg. Illumination Initiated RAU State 1028 via path 1030A.

GMM Reg. Normal Service Dark Beam RAU State 1026 is the state GMM Layer 804 shall enter when it receives a dark beam event while attempting to perform a routing area update (from GMM Routing Area Update Initiated State 1022) or the RAI Timer (T3312) expires while in GMM Reg. Normal Service Dark Beam State 1032, via path 1032C. GMM Layer 804 will remain in GMM Reg. Normal Service Dark Beam RAU State 1026 until it receives a light beam indication or a trigger to send user data. On receiving a light beam indication GMM Layer 804 will transition to GMM Reg. Update Needed State 1020 via path 1026B. If a trigger is received to send user data while in GMM Reg. Normal Service Dark Beam RAU State 1026, GMM Layer 804 will transition to GMM Reg. Illumination Initiated RAU State 1028, via path 1026A.

GMM Reg. Illumination Initiated RAU State 1028 is the state GMM Layer 804 shall enter when it receives a trigger to send user data in while in GMM Reg. Normal Service Dark Beam RAU State 1026 (via path 1026A) or RAI Timer (T3312) expires while waiting for a beam indication while in GMM Reg. Illumination Initiated State 1030, via path 1030A. User data is buffered while in GMM Reg. Illumination Initiated RAU State 1028 until a light beam or dark beam indication is received. On receiving a light beam indication GMM Layer 804 will transition to GMM Reg. Update Needed State 1020, via path 1028A, and perform a routing area update. If a dark beam indication is received GMM Layer 804 will return to GMM Reg. Normal service Dark Beam RAU State 1026, via path 1028B.

GMM Dereg. Invalid Position State 1040 is a state that is entered from: GMM Routing Area Update Initiated State 1022 via path 1022C; GMM Reg. Normal Service State 1018 vic path 1018D; and GMM Registered Initiated State 1014 via path 1014D for several reasons. While in GMM Dereg. Invalid Position State 1040, access terminal will, if timer T3213 expires, perform a periodic routing update. The following paragraphs explain the relative importance of this state, and the reasons why GMM Layer 804 enters this state.

Multiple Gateway Stations may provide service within a spot beam. However, the coverage of a spot beam is large, and the Gateway Stations may only be allowed to provide coverage in a portion of the beam. Also, different Gateway Stations might provide service into different geographic regions within a spot beam 10. Gateway Stations inform access terminals 20 about position based service limitation via reject causes in response to Channel Request messages.

If access terminal 20 is at a location from which service might be obtained but not from the location area identifier (LAI) that was selected by access terminal 20, a Channel Request message can be rejected with the reject cause "Invalid position for the Selected LAI." The selected LAI is no longer available. Access terminal 20 shall select any other LAI that is still available. If access terminal 20 receives this cause upon access of the final "Available" LAI, it shall treat this case in the same manner as for "Invalid Position."

If access terminal 20 is at a location from which service is not available from any Gateway Station, the Channel Request message shall be rejected with the reject cause "Invalid Position" or "Invalid Position for the access terminal's Service Provider." Access terminal 20 shall consider all LAIs for this GMR-1 system to be not available and cease PLMN and LAI selection for the GMR-1 system. Access terminal 20 may remain in the Service Level (Normal Service or Limited Service) that was in effect prior to the Channel Request message.

There are number of situations in which the registration status of access terminal 20 cannot be determined, and access to the system is blocked in any case. The inability to obtain Normal Service is due to one or more of the following factors:
- An "Invalid Position" or "Invalid Position for the Access Terminal's Service Provider" response to a Channel Request; and
- A "Position Too Old" response to a Channel Request for an LR.

Under any of these conditions, access terminal's 20 registration status is indeterminate, and access terminal 20 may provide only Position-Restricted Service(s). Position-Restricted Service differs from Limited Service in that access terminal 20 will not attempt non-emergency calls for the latter. If access terminal 20 is in Position-Restricted Service, and the user attempts a call, access terminal 20 will attempt location registration and then follow with the service request, if it is successful. Other aspects of the Position-Restricted and Limited Services, such as non-responsiveness to pages and high-penetration alerts, are the same.

Spot beam selection is influenced by the "Invalid Position for the Selected Spot Beam" error cause in the Immediate Assignment Reject message.

If access terminal's 20 services "Invalid Position for the Selected Spot Beam" and the selection indication (SI) bit, (which indicates whether a BCCH is allowed to camp on) is:
- not set, no BCCH from this spot beam 10 (on the same satellite 6) shall be allowed for camp-on; or
- set, no BCCH from this satellite shall be allowed for camp-on.

This error cause shall always have a BCCH Carrier associated with it. Access terminal 20 shall synchronize to the associated BCCH carrier. If the reselection indication (RI) bit (indicating whether beam reselection is needed) is not set, the access terminal 20 shall evaluate the spot beam for suitability for camping on. If the RI bit is set, the access terminal 20 shall conduct a spot beam selection among this BCCH and the BCCHs of its BCCH_NEIGHBOR_LIST and identify suitable spot beams 10. After identifying new suitable spot beams, if any, access terminal 20 shall identify new suitable BCCHs, if any.

During a spot beam selection procedure that is executed in compliance with this clause, access terminal 20 might only identify new suitable BCCHs that are also on the Forbidden BCCH List (see later clauses). In this circumstance, access terminal 20 may identify a spot beam 10 as suitable even if it is more than a preset amount of decibels weaker than the strongest spot beam 10, provided that it is the strongest spot beam 10 not already disallowed for camp-on and that it exceeds the minimum BCCH power threshold.

The present invention has been described with reference to certain exemplary embodiments thereof. However, it will be readily apparent to those skilled in the art that it is possible to embody the invention in specific forms other than those described of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for operating a software layer in a user's access terminal in a satellite based telecommunications systems, comprising the step of:
   entering a deregistered state from power-off state:
   initiating an attach request procedure from an access terminal to an existing network;
   identifying a PLMN of a first broadcast channel, camping on the first broadcast channel and establishing deregistered service with a first network through use of the first broadcast channel;
   entering a registered illuminated state if a dark beam is illuminated, and entering a deregistered dark beam state if the dark beam is not illuminated; and
   engaging in telecommunication activities with a new network while in the registered illuminated dark beam states; and
   wherein the step of entering a registered illuminated dark beam state if a dark beam is illuminated comprises:
      entering a deregistered illuminated attach needed state from the deregistered illuminated normal service state based on a third set of conditions;
      entering an illuminated GMM registered initiated state from the deregistered illuminated attach needed state based on a fourth set of conditions; and
      entering into a registered illuminated normal service state from the GMM registered illuminated initiated state based on a fifth set of conditions; and
   wherein the third set of conditions comprises:
      an attach request is initiated to a second network from the access terminal in a first network.

2. A method for operating a software layer in a user's access terminal in a satellite based telecommunications systems, comprising the steps of:
   entering a deregistered state from a power-off state;
   initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging telecommunications activities with a new network while in the registered illuminated dark beam state; and wherein the step of entering a registered illuminated dark beam state if a dark beam is illuminated comprises:

entering a deregistered illuminated attach needed state from the deregistered illuminated normal service state based on a third set of conditions;

entering an illuminated GMM registered initiated state from the deregistered illuminated attach needed state based on a fourth set of conditions; and entering into a registered illuminated normal service state from the GMM registered illuminated initiated state based on a fifth set of conditions; and wherein the fourth set of conditions comprises:

the attach request is transmitted from the access terminal in the first network to the second network.

3. A method for operating a software layer in a user's access terminal in a satellite based telecommunications systems, comprising the steps of:

entering a deregistered state from a power-off state;

initiating an attach request procedure from an access terminal to an existing network;

identifying PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and wherein the step of entering a registered illuminated dark beam state if a dark beam is illuminated comprises:

entering a deregistered illuminated attach needed state from the deregistered illuminated normal service state based on a third set of conditions;

entering an illuminated GMM registered initiated state from the deregistered illuminated attach needed state based on a fourth set of conditions; and entering into a registered illuminated normal service state from the GMM registered illuminated initiated state based on a fifth set of conditions; and wherein the fifth set of conditions comprises:

the attach request is accepted by the second network.

4. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and wherein the step of entering a dark beam deregistered state if the dark beam is not illuminated comprises:

entering into the deregistered dark beam normal service state from the deregistered illuminated attach needed state, based on a sixth set of conditions; and wherein;

the sixth set of conditions is a condition selected from the group consisting of a beam darkening event, an immediate assignment reject message indicating that the new service is not available, an immediate assignment reject message indicating that the resource is not available and an immediate assignment reject message indicating that the reported position of the access terminal is too old.

5. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising entering a registered dark beam state from a registered illuminated state, and leaving the registered dark beam state to enter the registered illuminated state; and wherein the step of entering a registered dark beam state from a registered illuminated state upon the existence of one or more of a first group of conditions comprises entering a registered dark beam normal service state from a registered illuminated normal service state to based on a seventh set of conditions; and wherein the seventh set of conditions comprises:

the illuminated beam is darkened.

6. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising entering a registered dark beam state from a registered illuminated state, and leaving the registered dark beam state to enter the registered illuminated state; and wherein the step of leaving the registered dark beam state to enter the registered illuminated state comprises entering a registered illuminated normal service state from a registered dark beam normal service state based on art eighth set of conditions; and
wherein the eighth set of conditions comprises:
the dark beam is illuminated.

7. A method for operating a software layer in a user's access terminal in a satellite based telecommunications systems, comprising the step of:
entering a deregistered state from a power-off state;
initiating an attach request procedure from an access terminal to an existing network;
identifying a PLMN of a first broadcast channel, camping on the first broadcast channel and establishing deregistered service with a first network through use of the first broadcast channel;
entering a registered illuminated state if a dark beam is illuminated, and entering a deregistered dark beam state if the dark beam is not illuminated; and
engaging in telecommunications activities with a new network while in the registered illuminated dark beam state; and
further comprising leaving the deregistered dark beam state for an deregistered illuminated state; and
wherein the step of leaving me deregistered dark beam state for a deregistered illuminated state comprises entering a deregistered illuminated PLMN search state from a deregistered dark beam normal service state based on a ninth set of conditions; and
wherein the ninth set of conditions comprises:
the dark beam is illuminated.

8. A method for operating a software layer in a user's access terminal in a satellite based telecommunications systems, comprising the steps of:
entering a deregistered state from a power-off state;
initiating an attach request procedure from an access terminal to art existing network;
identifying a PLMN of a first broadcast channel, camping on the first broadcast channel and establishing deregistered service with a first network through use of the first broadcast channel;
entering a registered illuminated state it a dark beam is illuminated, and entering a deregistered dark beam state the dark beam is not illuminated; and
engaging in telecommunications activities with a new network while in the registered illuminated dark beam state; and
further comprising initiating a position update procedure while in a registered illuminated state; and
wherein;
the initiated position update procedure while in a registered illuminated state is not performed successfully.

9. A method for operating a software layer in a user's access terminal in a satellite based telecommunications systems, comprising the steps of:
entering a deregistered state from a power-off state;
initiating an attach request procedure from an access terminal to an existing network;
identifying a PLMN of a first broadcast channel, camping on the first broadcast channel and establishing deregistered service with a first network through use of the first broadcast channel;
entering a registered illuminated state if a dark beam is illuminated, and entering a deregistered dark beam state if the dark beam is not illuminated; and
engaging in telecommunications activities with a new network while in the registered illuminated dark beam state; and
further comprising initiating a position update procedure while in a registered illuminated state; and
wherein the initiated position update procedure while in a registered illuminated state is performed successfully; and
wherein the step of performing the initiated position update procedure while in a registered illuminated state successfully comprises:
entering a registered illuminated update needed state from the registered illuminated normal service state based on a tenth set of conditions;
entering a registered illuminated GMM muting area update initiated state from the registered illuminated update needed state based on a eleventh set of conditions; and
entering the deregistered illuminated normal service state from the registered illuminated GMM routing area update initiated state based on an twelfth set of conditions; and
wherein the tenth set of conditions comprises:
a routing area update timer has expired or a change in muting area has occurred to the access terminal.

10. A method for operating a software layer in a user's access terminal in a satellite based telecommunications systems, comprising the step of:
entering a deregistered state from a power-off state;
initiating an attach request procedure from an access terminal to an existing network;
identifying a PLMN of a first broadcast channel, camping on the first broadcast channel and establishing deregistered service with a first network through use of the first broadcast channel;
entering a registered illuminated state if a dark beam is illuminated, and entering a deregistered dark beam state if the dark beam is not illuminated; and
engaging in telecommunications activities with a new network while in the registered illuminated dark beam state; and
further comprising initiating a position update procedure while in a registered illuminated state; and
wherein the initiated position update procedure while in a registered illuminated state is performed successfully; and
wherein the step of performing the initiated position update procedure while in a registered illuminated state successfully comprises:
entering a registered illuminated update needed state from the registered illuminated normal service state based on a tenth set of conditions;
entering a registered illuminated GMM routing area update initiated state from the registered illuminated update needed state based on a eleventh set of conditions; and
entering the registered illuminated normal service state from the registered illuminated GMM routing area update initiated state based on an twelfth set of conditions; and
wherein the eleventh set of conditions comprises:
a routing area update request is transmitted.

11. A method for operating a software layer in a user's access terminal in a satellite based telecommunications systems, comprising the steps of:
entering a deregistered state from a power-off state;
initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising initiating a position update procedure while in a registered illuminated state; and wherein the initiated position update procedure while in a registered illuminated state is performed successfully; and wherein the step of performing the initiated position update procedure while in a registered illuminated state successfully comprises:

entering a registered illuminated update needed state from the registered illuminated normal service state based on a tenth set of conditions;

entering a registered illuminated GMM muting area update initiated state from the registered illuminated update needed state based on a eleventh set of conditions; and entering the registered illuminated normal service state from the registered illuminated GMM routing area update initiated state based on an twelfth set of conditions; and wherein the twelfth set of conditions comprises:

the routing area update request is accepted, or a routing are update attempt counter is less than an attempt counter number, a failure case occurs and a current routing area indicator equals a stored routing area indicator.

12. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications with a new network while in the registered illuminated dark beam state; and further comprising initiating a position update, procedure while in a registered illuminated state; and wherein the initiated position update procedure while in a registered illuminated state is performed successfully; and wherein the step of performing the initiated position update procedure while in a registered illuminated state is not performed successfully comprises:

entering a registered illuminated update needed state from the registered illuminated normal service state based on a tenth set of conditions;

entering a registered illuminated GMM routing are update initiated state from the registered illuminated update needed state based on an eleventh set of conditions;

entering a registered illuminated attempting to update state from the registered illuminated GMM routing area update initiated state;

entering the registered illuminated update needed state from the registered illuminated attempting to update state based on a thirteenth set of conditions; and repeating these steps until the routing area update request is accepted, or a routing are update attempt counter is less than a attempt counter number, a failure case occurs and a current routing area indicator equals a stored routing area indicator; and wherein the thirteenth set of conditions comprises a T3311 timer expires or a T3302 timer expires.

13. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising initiating a position update procedure while in a registered illuminated state; and wherein the initiated position update procedure while in a registered illuminated state is performed successfully; and wherein the step of performing the initiated position update procedure while in a registered illuminated state is not performed successfully comprises:

entering a registered illuminated update needed state from the registered illuminated normal service state based on a tenth set of conditions;

entering a registered illuminated GMM routing area update initiated state from the registered illuminated update needed state based on an eleventh set of conditions;

entering a registered illuminated attempting to update state from the registered illuminated GMM routing area update initiated state;

entering the registered illuminated update needed state from the registered illuminated attempting to update state based on a thirteenth set of conditions; and repeating these steps until the routing area update request is accepted, or a routing are update attempt counter is less than an attempt counter number, a failure case occurs and a current routing area indicator equals a stored routing area indicator; and further comprising:

entering a registered dark beam normal service routing area update state from the registered illuminated GMM routing area update initiated state, the registered illuminated attempting to update state or the registered illuminated update needed state based on a beam darkening event.

14. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications with a new network while in the registered illuminated dark beam state; and further comprising entering a registered dark beam normal service state from the registered illuminated normal service state, and entering a registered dark beam normal service routing area update state from the registered dark beam normal service state; and wherein the step of entering a registered dark beam routing area update state from the registered dark beam state comprises:

entering a registered dark beam illuminated initiated state from the registered dark beam normal service state based on a fourteenth set of conditions;

entering a registered dark beam illumination initiated routing area updated state from the registered dark beam illumination initiated state based on a fifteenth set of conditions; and entering a registered dark beam normal service dark beam routing area update state based on a sixteenth set of conditions; and wherein the fourteenth set of conditions comprises:

a user request.

15. A method for operating a software layer in a user's access terminal in a satellite based telecommunications systems, comprising the step of:

entering a deregistered state from a power-off state;

initiating an attach request procedure from an access terminal to existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising entering a registered dark beam normal service state from the registered illuminated normal service state, and entering a registered dark beam normal service routing area update state from the registered dark beam normal service state; and wherein the step o entering a registered dark beam routing area update state from the registered dark beam state comprises:

entering a registered dark beam illuminated initiated state from the registered dark beam normal service state based on a fourteenth set of conditions;

entering a registered dark beam illumination initiated routing area updated state from the registered dark beam illumination initiated state based on a fifteenth set of conditions; and entering a registered dark beam normal service dark beam routing area update state based on a sixteenth set of conditions; and wherein the fifteenth set of conditions comprises:

a T3312 timer expiration or a beam reselection.

16. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising entering a registered dark beam normal service state from the registered illuminated normal service state, and entering a registered dark beam normal service routing area update state from the registered dark beam normal service state; and wherein the step of entering a registered dark beam routing area update state from the registered dark beam state comprises:

entering a registered dark beam illuminated initiated state from the registered dark beam normal service state based on a fourteenth set of conditions;

entering a registered dark beam illumination initiated routing area update state from the registered dark beam illumination initiated state based on a fifteenth set of conditions; and entering a registered dark beam normal service dark beam routing area update state based on a sixteenth set of condition; and wherein the sixteenth set of conditions comprises:

an illumination failure.

17. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications with a new network while in the registered illuminated dark beam state; and further comprising entering a registered dark beam normal service state from the registered illuminated normal service state, and entering a registered dark beam normal service routing area update state from the registered dark beam normal service state; and wherein the step of entering a registered dark beam routing area update state from the registered dark beam state comprises:

entering a registered dark beam illuminated initiated state from the registered dark beam normal service state based on a fourteenth set of conditions;

entering a registered dark beam illumination initiated routing area update state from the registered dark beam illumination initiated state based on a fifteenth set of conditions; and entering a registered dark beam normal service dark beam routing area update state based on a sixteenth set of conditions; and further comprising entering the registered dark beam normal service state from the registered dark beam illumination initiated state based on an seventeenth set of conditions, and entering the registered illuminated normal service state based on a eighteenth set of conditions; and wherein the seventeenth set of conditions comprises:

an illumination failure.

18. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising entering a registered dark beam normal service state from the registered illuminated normal service state, and entering a registered dark beam normal service routing area update state from the registered dark beam normal service state; and wherein the step of entering a registered dark beam routing area update state from the registered dark beam state comprises:

entering a registered dark beam illuminated initiated state from the registered dark beam normal service state based on a fourteenth set of conditions;

entering a registered dark beam illumination initiated routing area updated state from the registered dark beam illumination initiated state based on a fifteenth set of conditions; and entering a registered dark beam normal service dark beam routing area update state based on a sixteenth set of conditions; and further comprising entering the registered dark beam normal service state from the registered dark beam illumination initiated state based on an seventeenth set of conditions, and entering the registered illuminated normal service state based on a eighteenth set of conditions; and wherein the eighteenth set of conditions comprises:

a beam illumination or a rejection to a new broadcast control channel.

19. A method for operating a software layer in a user's access terminal in a satellite based telecommunications systems, comprising the steps of:

entering a deregistered state from a power-off state;

initiating an attach request procedure from an access terminal to an existing network;

identifying a PLMN of a first broadcast channel, camping on the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising entering a registered dark beam normal service state from the registered illuminated normal service state, and entering a registered dark beam normal service routing area update state from the registered dark beam normal service state; and wherein the step of entering a registered dark beam routing area update state from the registered dark beam state comprises:

entering a registered dark beam illuminated initiated state from the registered dark beam normal service state based on a fourteenth set of conditions;

entering a registered dark beam illumination initiated routing area updated state from the registered dark beam illumination initiated state based on a fifteenth set of conditions; and entering a registered dark beam normal service dark beam routing area update state based on a sixteenth set of conditions; and further comprising entering an registered illuminated update needed state from the registered dark beam illumination initiated routing area update state based on a nineteenth set of conditions; and wherein the nineteenth set of conditions comprises:

a beam illumination or a rejection to a new broadcast control channel.

20. A method for operating a software layer in a user's access terminal in a satellite based telecommunications system, comprising the steps of:

entering a deregistered state from a power-off state;

initiating an attach request procedure from an access terminal to an existing network;

identifying a PLMN of a first broadcast channel, camping an the first broadcast channel and establishing deregistered service with a first network through use of the first broadcast channel;

entering a registered illuminated state if a dark beam is illuminated, and entering a deregistered dark beam state if the dark beam is not illuminated; and engaging in telecommunications activities with a new network while in the registered illuminated dark beam state; and further comprising entering a registered dark beam normal service state from the registered illuminated normal service state, and entering a registered dark beam normal service routing area update state from the registered dark beam normal service state; and further comprising entering a registered dark beam normal service state from the registered dark beam normal service routing area update state based on a twentieth set of conditions; and wherein the twentieth set of conditions comprises:

expiration of a T3312 timer or a beam reselection event.

21. A method for operating a software layer in a user's access terminal in a satellite based telecommunications systems, comprising the steps of:

entering a deregistered state from a power-off state;
initiating an attach request procedure from an access terminal to an existing network;
identifying a PLMN of a first broadcast channel, camping on the first broadcast channel and establishing deregistered service with a first network through use of the first broadcast channel
entering a registered illuminated state if a dark beam is illuminated, and entering a deregistered dart beam state if the dark beam is not illuminated; and
engaging in telecommunications activities with a new network while in the registered illuminated dark beam state; and
further comprising entering a registered dark beam normal service state from the registered illuminated normal service state, and entering a registered dark beam normal service routing area update state from the registered dark beam normal service state; and
further comprising entering a registered dark beam normal service state from the registered dark beam normal service routing area update state based on a twentieth set of conditions; and
further comprising entering the registered dark beam illumination initiated routing area update state from the registered dark beam normal service routing area update state based on a twenty-first set of conditions, and entering the registered illuminated update needed state from the registered dark beam normal service routing area update state based on a twenty-second set of conditions; and
wherein the twenty-first set of conditions comprises:
a user request.

22. A method for operating a software layer in a user's access terminal in a satellite based telecommunications systems, comprising the steps of:
entering a deregistered state from a power-oft state;
initiating an attach request procedure from an access terminal to an existing network;
identifying a PLMN of a first broadcast channel, camping on the first broadcast channel and establishing deregistered service with a first network through use of the first broadcast channel;
entering a registered illuminated state if a dark beam is illuminated, and entering a deregistered dark beam state if the dark beam is not illuminated; and
engaging in telecommunications activities with a new network while in the registered illuminated dark beam state; and
further comprising entering a deregistered state from a plurality of registered states based on a twenty-third set of conditions; and
wherein the deregistered state comprises:
a GMM deregistered illuminated invalid position state.

23. A method for operating a software layer in a user's access terminal in a satellite based telecommunications systems, comprising the steps of:
entering a deregistered state from a power-off state;
initiating an attach request procedure from an access terminal to an existing network;
identifying a PLMN of a first broadcast channel, camping on the first broadcast channel and establishing deregistered service with a first network through use of the first broadcast channel;
entering a registered illuminated state if a dark beam is illuminated, and entering a deregistered dark beam state if the dark beam is not illuminated; and
engaging in telecommunications activities with a new network while in the registered illuminated dark beam state; and
further comprising entering a deregistered state from a plurality of registered states based on a twenty-third set of conditions; and
wherein the twenty-third set of conditions comprises:
an invalid position of the access terminal, an invalid position for the access terminal's SP, or, an invalid position for selected location area identifies and no additional location area identities are available.

24. A method for operating a software layer in a user's access terminal in a satellite based telecommunications systems, comprising the step of:
entering a deregistered state from a power-off state;
initiating an attach request procedure from an access terminal to an existing network;
identifying an PLMN of a first broadcast channel, camping on the first broadcast channel and establishing deregistered service with a first network through use of the first broadcast channel;
entering a registered illuminated state if a dark beam is illuminated, and entering a deregistered dark beam state if the dark beam is not illuminated; and
engaging in telecommunications activities with a new network while in the registered illuminated dark beam state; and
further comprising entering a deregistered state from a plurality of registered states based on a twenty-third set of conditions; and
wherein the registered states comprises:
the registered illuminated normal service state and the illuminated GMM routing area update initiated state.

25. A method for operating a software layer in a user's access terminal in a satellite based telecommunications systems, comprising the steps of:
entering a deregistered state from a power-off state;
initiating an attach request procedure from an access terminal to an existing network;
identifying a PLMN of a first broadcast channel, camping on the first broadcast channel and establishing deregistered service with a first network through use of the first broadcast channel;
entering a registered illuminated state if a dart beam is illuminated, and entering a deregistered dark beam state if the dark beam is not illuminated; and
engaging in telecommunications activities with a new network while in the registered illuminated dark beam state; and
further comprising entering a deregistered state from the GMM registered initiated state based on a twenty-fourth set of conditions; and
wherein the deregistered state comprises:
a GMM deregistered illuminated invalid position state.

26. A method for operating a software layer in a user's access terminal in a satellite based telecommunications systems, comprising the steps of:
entering a deregistered state from a power-off state;
initiating an attach request procedure from an access terminal to an existing network;
identifying a PLMN of a first broadcast channel, camping on the first broadcast channel and establishing deregistered service with a first network through use of the first broadcast channel;
entering a registered illuminated state if a dark beam is illuminated, and entering a deregistered dark beam state if the dark beam is not illuminated; and engaging in telecommunications activities with a new network while in the registered illuminated dark beam state; and further comprising entering a deregistered state from the GMM registered initiated state based on a twenty-fourth set of conditions; and wherein the twenty-fourth set of conditions comprises:
an invalid position of the access terminal, an invalid position for the access terminal's SP, or, an invalid position for selected location area identities and no additional location area identities are available.

* * * * *